(12) United States Patent
Kim et al.

(10) Patent No.: US 12,298,623 B2
(45) Date of Patent: May 13, 2025

(54) DISPLAY DEVICE

(71) Applicant: LG ELECTRONICS INC., Seoul (KR)

(72) Inventors: Geunhwan Kim, Seoul (KR); Juyoung Joung, Seoul (KR); Woongjoon Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/700,879

(22) PCT Filed: Oct. 13, 2021

(86) PCT No.: PCT/KR2021/014079
§ 371 (c)(1),
(2) Date: Apr. 12, 2024

(87) PCT Pub. No.: WO2023/063439
PCT Pub. Date: Apr. 20, 2023

(65) Prior Publication Data
US 2024/0411176 A1   Dec. 12, 2024

(51) Int. Cl.
*G02F 1/13357* (2006.01)
*G02F 1/1335* (2006.01)

(52) U.S. Cl.
CPC .. *G02F 1/133606* (2013.01); *G02F 1/133605* (2013.01); *G02F 1/133608* (2013.01); *G02F 1/133614* (2021.01)

(58) Field of Classification Search
CPC ......... G02F 1/133608; G02F 1/133603; G02F 1/133314; G02F 1/133605; G02F 1/133606
See application file for complete search history.

(56) References Cited

U.S. PATENT DOCUMENTS

| | | | |
|---|---|---|---|
| 2005/0146895 A1* | 7/2005 | Hsieh | G02F 1/133608 362/613 |
| 2013/0135539 A1* | 5/2013 | Kamata | H04N 3/14 348/790 |
| 2017/0009960 A1* | 1/2017 | Ahn | G02F 1/133608 |
| 2019/0243172 A1* | 8/2019 | Gotou | G02F 1/1336 |
| 2021/0074693 A1* | 3/2021 | Sim | H01L 25/13 |
| 2021/0302785 A1* | 9/2021 | Nam | G02F 1/133605 |

FOREIGN PATENT DOCUMENTS

| | | |
|---|---|---|
| JP | 2019-46566 A | 3/2019 |
| KR | 10-2017-0005537 A | 1/2017 |
| KR | 10-2020-0028554 A | 3/2020 |
| KR | 10-2094829 B1 | 3/2020 |
| KR | 10-2124905 B1 | 6/2020 |

* cited by examiner

*Primary Examiner* — Erin Kryukova
(74) *Attorney, Agent, or Firm* — Birch, Stewart, Kolasch & Birch, LLP

(57) ABSTRACT

A display device is disclosed. The display device may include: a display panel; a frame positioned behind the display panel; a substrate positioned between the display panel and the frame, and coupled to the frame; a plurality of light sources positioned on the substrate and providing light to the display panel; a diffusion plate positioned between the display panel and the plurality of light sources; and a film coupled to the substrate between the diffusion plate and the substrate, and through which the plurality of light sources pass, wherein the film includes a spacer depressed toward the diffusion plate from a rear surface of the film and supporting the diffusion plate.

14 Claims, 24 Drawing Sheets

[FIG. 19]
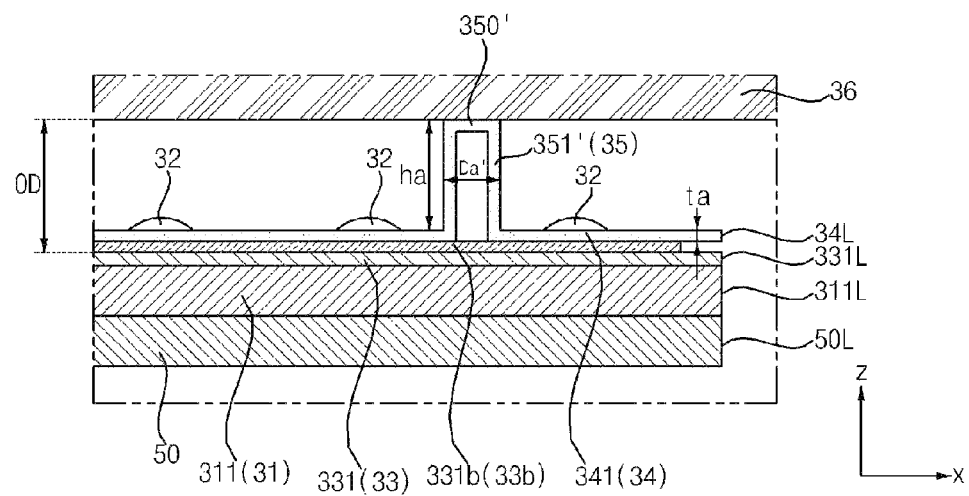

[FIG. 20]
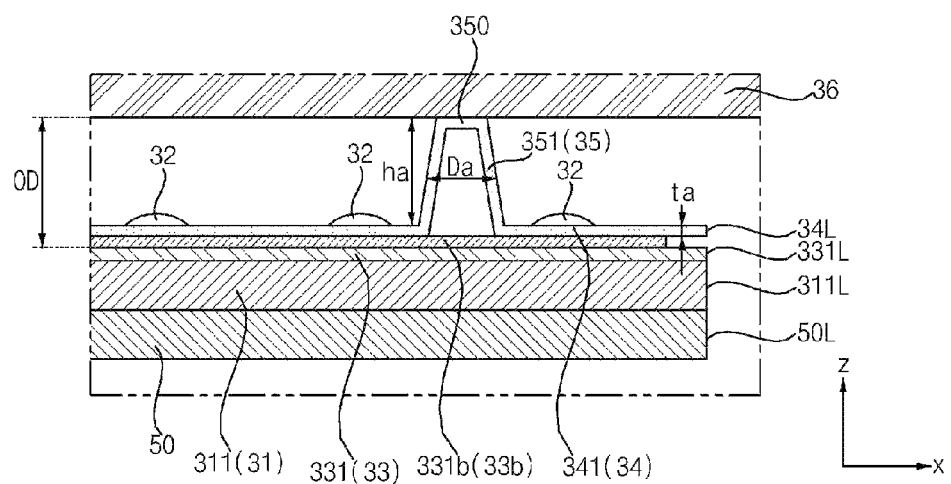

[FIG. 21]
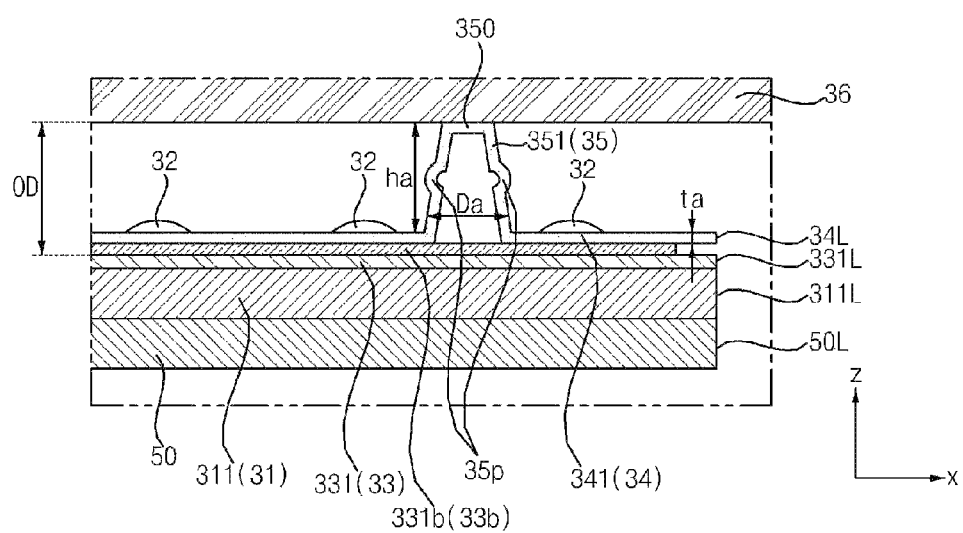

[FIG. 22]
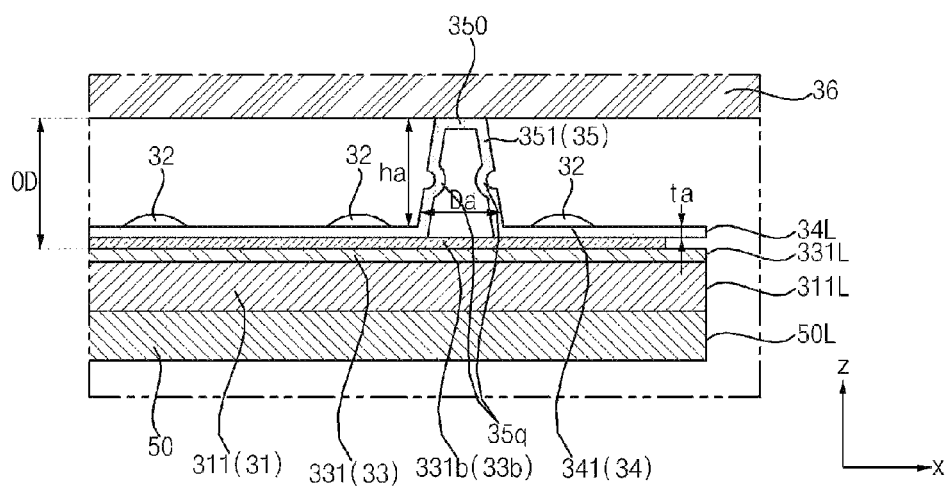

[FIG. 23]
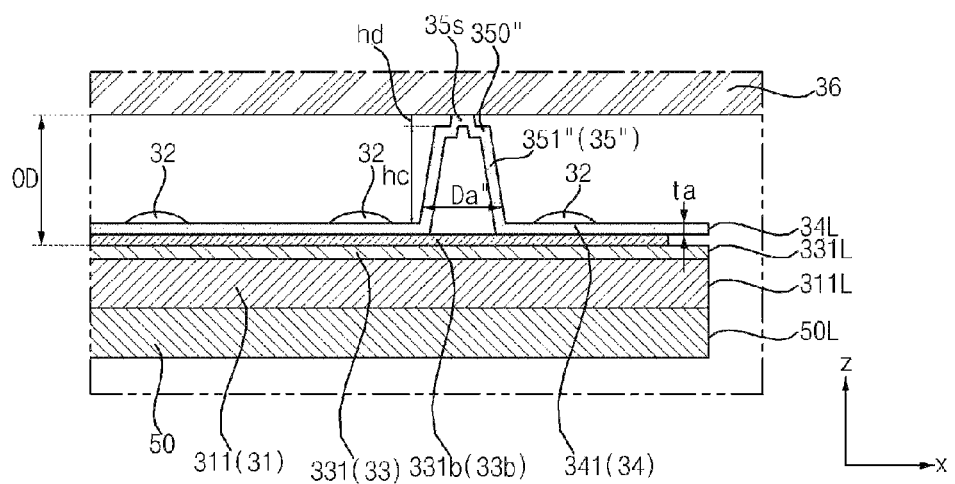

[FIG. 24]
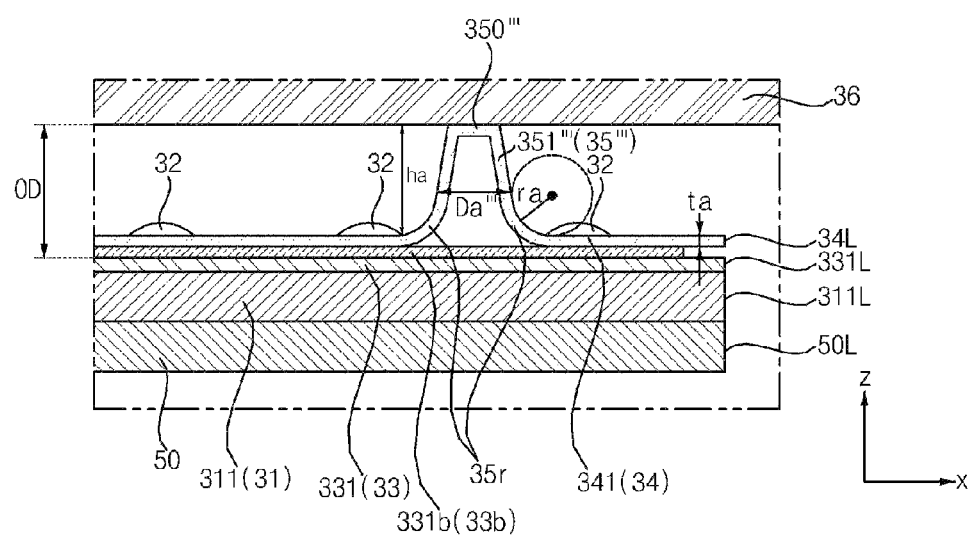

DISPLAY DEVICE

CROSS REFERENCE TO RELATED APPLICATIONS

This application is the National Phase of PCT International Application No. PCT/KR2021/014079, filed on Oct. 13, 2021, all of which are hereby expressly incorporated by reference into the present application.

TECHNICAL FIELD

The present disclosure relates to a display device.

BACKGROUND ART

With the development of information society, there has been a growing demand for various types of display devices. In order to meet such demand, various display devices, such as a liquid crystal display (LCD), an electro luminescent display (ELD), a vacuum fluorescent display (VFD), an organic light emitting diode (OLED), a Micro-LED, and the like, have been developed and used.

Among them, an LCD panel includes a liquid crystal layer, a TFT substrate, and a color substrate, the TFT substrate and the color substrate being opposite each other with the liquid crystal layer interposed therebetween, so as to display an image using light provided from a backlight unit.

Recently, with the increasing interest in image quality of display devices, numerous research has been conducted on the improvement in color difference and color gamut.

DETAILED DESCRIPTION OF INVENTION

Technical Problems

It is an objective of the present disclosure to solve the above and other problems.

Another objective may be to provide a display device that can maintain a distance between a reflective sheet and a diffusion plate through a film-type spacer.

Another objective may be to provide a display device that can improve color difference and color gamut.

Another objective may be to provide a display device that can improve image quality.

Another objective may be to provide various examples of an elastic structure of a film-type spacer.

Another objective may be to provide the coupling structure of a substrate, a reflective sheet, and a film-type spacer.

Technical Solution

In accordance with an aspect of the present disclosure to achieve the above or other objectives, a display device may include: a display panel; a frame positioned behind the display panel; a substrate positioned between the display panel and the frame, and coupled to the frame; a plurality of light sources positioned on the substrate and providing light to the display panel; a diffusion plate positioned between the display panel and the plurality of light sources; and a film coupled to the substrate between the diffusion plate and the substrate, and through which the plurality of light sources pass, wherein the film may include a spacer depressed toward the diffusion plate from a rear surface of the film and supporting the diffusion plate.

Effect of Invention

A display device according to the present disclosure has the following effects.

According to at least one of the embodiments of the present disclosure, it is possible to provide a display device capable of maintaining a distance between a reflective sheet and a diffusion plate through a film-type spacer.

According to at least one of the embodiments of the present disclosure, it is possible to provide a display device capable of improving color difference and color gamut.

According to at least one of the embodiments of the present disclosure, it is possible to provide a display device capable of improving image quality.

According to at least one of the embodiments of the present disclosure, it is possible to provide various examples of an elastic structure of a film-type spacer.

According to at least one of the embodiments of the present disclosure, it is possible to provide a coupling structure of a substrate, a reflective sheet, and a film-type spacer.

Further scope of applicability of the present disclosure will become apparent from the following detailed description. However, it should be understood that the detailed description and specific embodiments such as preferred embodiments of the present disclosure are given by way of example only, since various changes and modifications within the idea and scope of the present disclosure may be clearly understood by those skilled in the art.

BRIEF DESCRIPTION OF THE DRAWING

FIGS. 1 to 24 are diagrams illustrating examples of a display device according to embodiments of the present disclosure.

MODE FOR CARRYING OUT THE INVENTION

Figure 1:
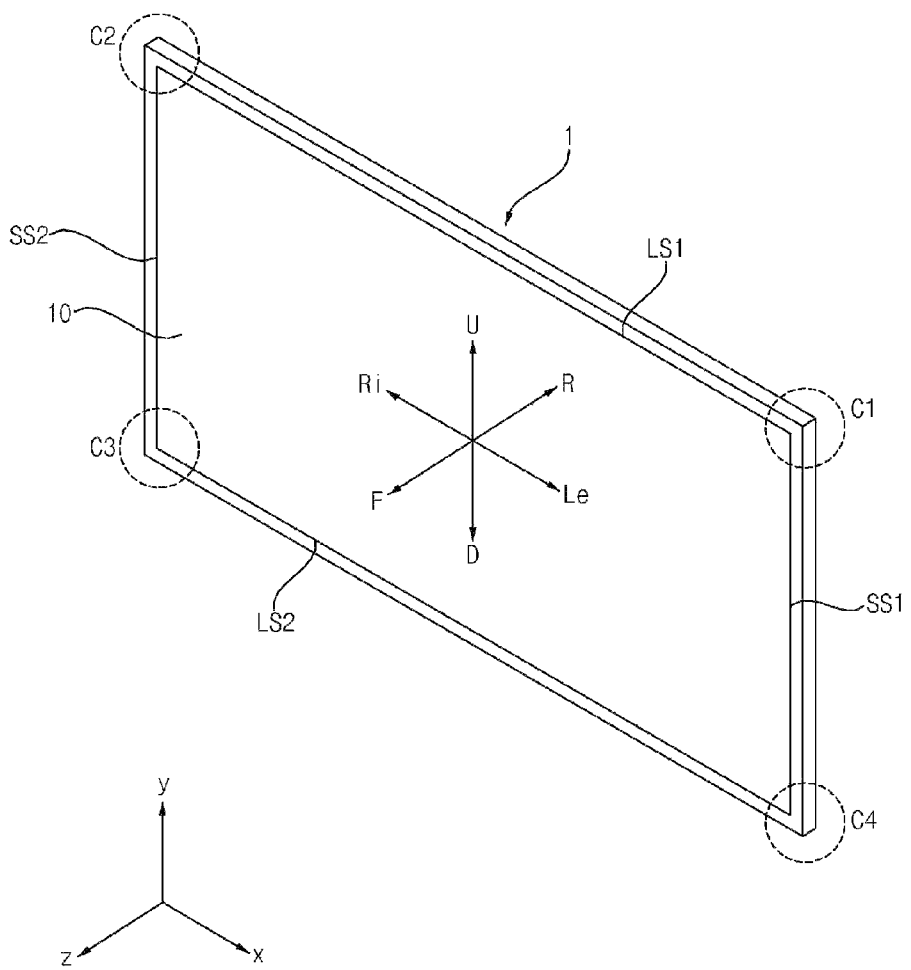

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In the following description, a suffix such as "module" and "unit" may be used to refer to elements or components. Use of such a suffix herein is merely intended to facilitate description of the specification, and the suffix itself is not intended to give any special meaning or function.

In the present disclosure, that which is well known to one of ordinary skill in the relevant art has generally been omitted for the sake of brevity. The accompanying drawings are used to help easily understand the technical idea of the present disclosure and it should be understood that the idea of the present disclosure is not limited by the accompanying drawings. The idea of the present disclosure should be construed to extend to any alterations, equivalents, and substitutes besides the accompanying drawings.

It will be understood that although the terms "first", "second", etc. may be used herein to describe various elements, these elements should not be limited by these terms. These terms are only used to distinguish one element from another.

It will be understood that when a component is referred to as being "connected to" or "coupled to" another component, it may be directly connected to or coupled to another component, or intervening components may be present. In contrast, when a component is referred to as being "directly connected to" or "directly coupled to" another component, there are no intervening components present.

As used herein, a singular representation is intended to include a plural representation unless the context clearly indicates otherwise.

It will be understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The directions "up (U)", "down (D)", "left (Le)", "right (Ri)", "front (F)", and "rear (R)" shown in the drawings are only for the convenience of description, and the technical concept disclosed in the specification is not limited by these directions.

Referring to FIG. 1, a display device 1 may include a display panel 10. The display panel 10 may display an image.

The display device 1 may include a first long side LS1, a second long side LS2 opposite the first long side LS1, a first short side SS1 adjacent to the first long side LS1 and the second long side LS2, and a second short side SS2 opposite the first short side SS1. For the convenience of explanation, it is illustrated and described that lengths of the first and second long sides LS1 and LS2 are greater than lengths of the first and second short sides SS1 and SS2. However, the lengths of the first and second long sides LS1 and LS2 may be substantially equal to the lengths of the first and second short sides SS1 and SS2.

A direction parallel to the long sides LS1 and LS2 of the display device 1 may be referred to as a left-and-right direction or a first direction. A direction parallel to the short sides SS1 and SS2 of the display device 1 may be referred to as an up-and-down direction or a second direction. A direction perpendicular to the long sides LS1 and LS2 and the short sides SS1 and SS2 of the display device 1 may be referred to as a front-and-rear direction or a third direction.

A direction in which the display panel 10 displays an image may be referred to as a front (F, z), and a direction opposite to the front may be referred to as a rear (R). The first long side LS1 may be referred to as an upper side (U, y). The second long side LS2 may be referred to as a lower side (D). The first short side SS1 may be referred to as a left side (Le, x). The second short side SS2 may be referred to as a right side (Ri).

The first long side LS1, the second long side LS2, the first short side SS1, and the second short side SS2 may be referred to as edges of the display device 1. In addition, points where the first long side LS1, the second long LS2, the first short side SS1, and the second short side SS2 meet one another may be referred to as corners.

For example, a point where the first short side SS1 and the first long side LS1 meet may be referred to as a first corner C1. A point where the first long side LS1 and the second short side SS2 meet may be referred to as a second corner C2. A point where the second short side SS2 and the second long side LS2 meet may be referred to as a third corner C3. A point where the second long side LS2 and the first short side SS1 meet may be referred to as a fourth corner C4.

Figure 2:
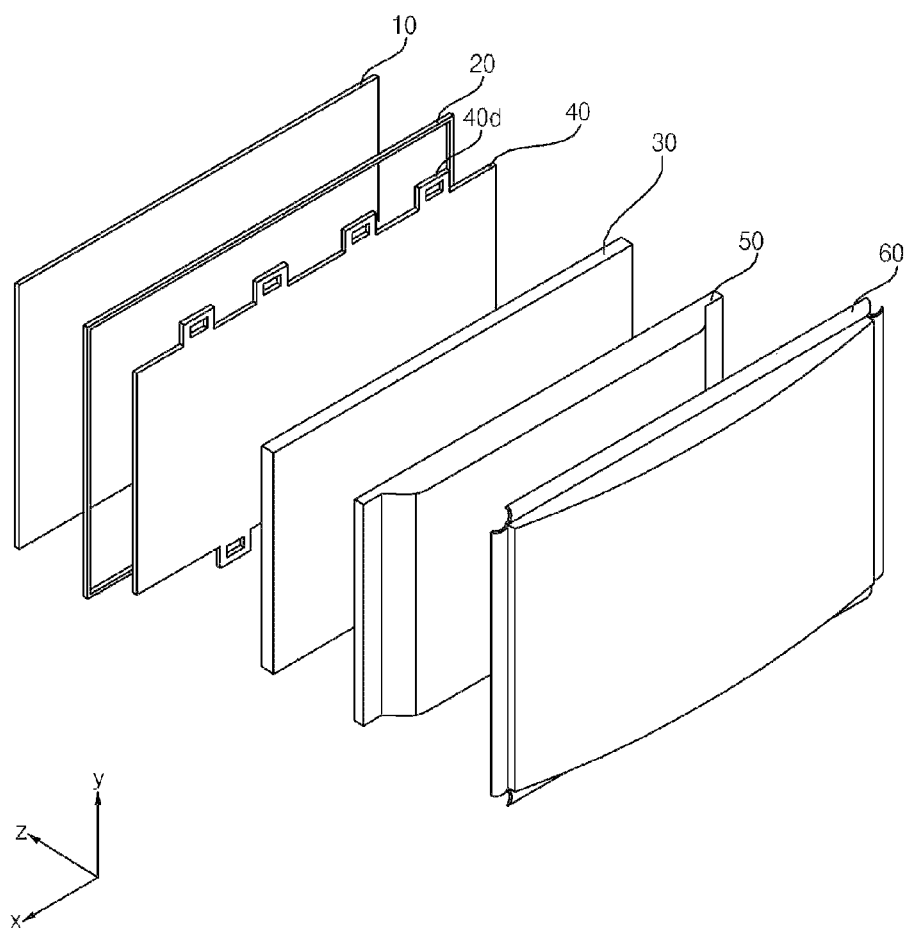

Referring to FIG. 2, the display device 1 may include a display panel 10, a guide panel 20, a backlight unit (30, 40), a frame 50, and a back cover 60.

The display panel 10 may define a front surface of the display device 1, and may display an image. The display panel 10 may display an image in such a manner that each of a plurality of pixels outputs red, green, or blue (RGB) light in accordance with timing. The display panel 10 may be divided into an active area in which an image is displayed and a de-active area in which no image is displayed. The display panel 10 may include a front substrate and a rear substrate that are opposite each other with a liquid crystal layer interposed therebetween. The display panel 10 may be referred to as an LCD panel.

The front substrate may include a plurality of pixels, each of which consists of red, green, and blue subpixels. The front substrate may output light corresponding to red, green, or blue color in response to a control signal.

The rear substrate may include switching elements. The rear substrate may switch a pixel electrode. For example, the pixel electrode may change the molecular arrangement of a liquid crystal layer in response to a control signal input from the outside. The liquid crystal layer may include liquid crystal molecules. The arrangement of liquid crystal molecules may be changed according to a voltage difference between the pixel electrode and a common electrode. The liquid crystal layer may transmit light provided from the backlight unit (30, 40) to the front substrate or block the light.

The guide panel 20 may surround the periphery of the display panel 10, and may cover a lateral surface of the display panel 10. The guide panel 20 may be coupled to the display panel 10 or may support the display panel 10. The guide panel 20 may be referred to as a side frame or a middle cabinet.

The backlight unit (30, 40) may be positioned in rear of the display panel 10. The backlight unit (30, 40) may include light sources. The backlight unit (30, 40) may be coupled to the frame 50 at the front of the frame 50. The backlight unit (30, 40) may be driven by a full driving scheme or a partial driving scheme such as local dimming or impulsive driving. The backlight unit (30, 40) may include an optical sheet 40 and an optical layer 30.

The optical sheet 40 may uniformly transmit light emitted from the light source to the display panel 10. The optical sheet 40 may consist of a plurality of layers. For example, the optical sheet 40 may include a prism sheet, a diffusion sheet, and the like. Meanwhile, a coupling portion 40d of the optical sheet 40 may be coupled to the frame 50 and/or the back cover 60.

The frame 50 may be positioned in rear of the backlight unit (30, 40), and may support the components of the display device 1. An edge of the frame 50 may be fixed to the guide panel 20. For example, components such as the backlight unit (30, 40) and a printed circuit board (PCB) on which a plurality of electronic components are disposed may be coupled to the frame 50. For example, the frame 50 may include a metal material. The frame 50 may be referred to as a main frame, a module cover, or a cover bottom.

The back cover 60 may cover the rear of the frame 50. The back cover 60 may be coupled to the frame 50. For example, the back cover 60 may include a metal material.

Figure 3:
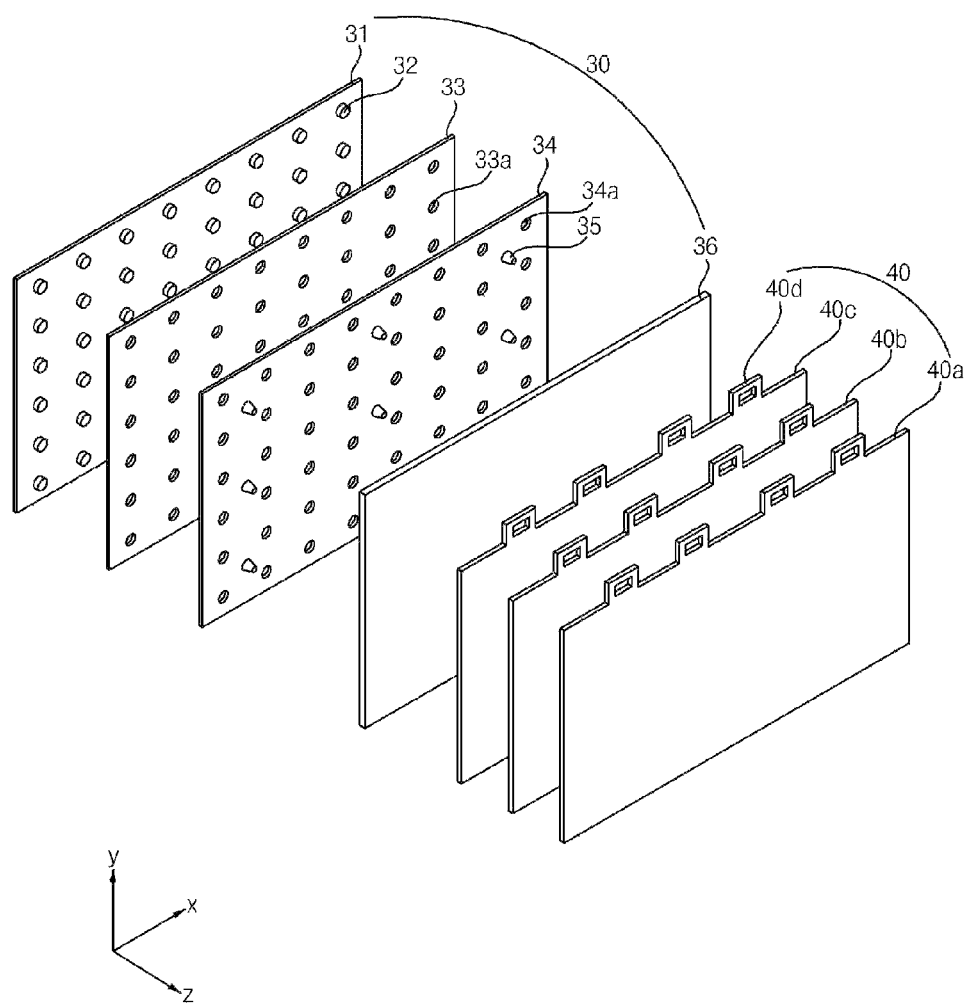
Figure 4:
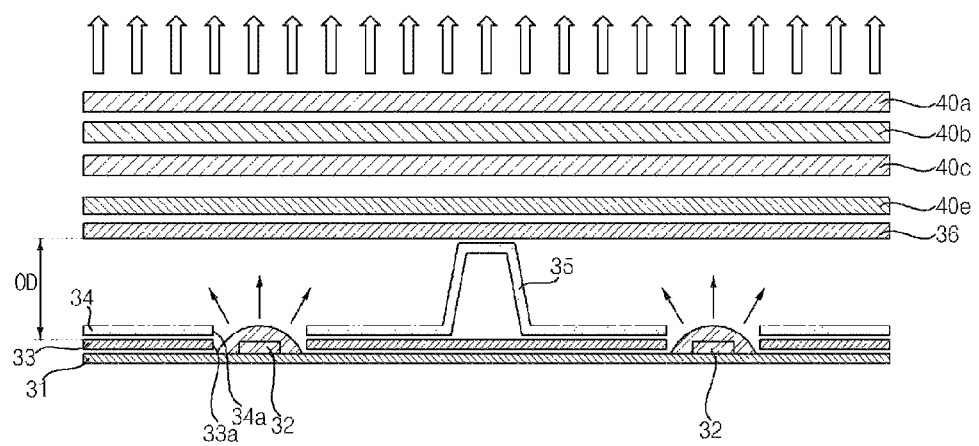

Referring to FIGS. 3 and 4, the optical layer 30 may include a substrate 31, at least one light source 32, a reflective sheet 33, a film 34, and a diffusion plate 36.

The substrate 31 may be positioned in front of the frame 50 (see FIG. 2). The substrate 31 may have the shape of a plate. The substrate 31 may be made of at least one of polyethylene terephthalate (PET), glass, polycarbonate (PC), and silicon. The substrate 31 may be a printed circuit board (PCB) on which at least one light source 32 is mounted.

At least one light source 32 may be mounted on the substrate 31. The light source 32 may be a light emitting diode (LED) chip or an LED package including at least one LED chip. For example, the light source 32 may be a colored LED emitting at least one of red, green, and blue light or a white LED. For example, the light source 32 may be a mini-LED.

For example, a plurality of light sources 32 may be mounted on the substrate 31 in rows and columns. The rows may be defined in the left-and-right direction, and the columns may be defined in the up-and-down direction.

For example, a plurality of lenses (no reference numeral) may cover the plurality of light sources 32, respectively. An accommodating portion (not shown) may be formed on a lower surface of the lens, and may surround the light source 32. A cover portion (not shown) may define an upper surface of the lens. For example, the cover portion may have the shape of a dome or the shape of two domes overlapping each other. For example, the lens may be a lens with asymmetric light distribution. For example, the lens 53 may be a refractive lens. The lens may include at least one of resin, silicone, polymethyl methacrylate (PMMA), and polycarbonate (PC). Accordingly, light provided by the light source 32 may be refracted or reflected by the lens to spread over a wider beam angle than the light source 32.

The reflective sheet 33 may be positioned in front of the substrate 31. At least one hole 33a may be formed through the reflective sheet 33, and the light source 32 may be positioned in the hole 33a. The reflective sheet 33 may include a metal and/or metal oxide. For example, the reflective sheet 33 may include a metal and/or metal oxide having a high reflectance such as at least one of aluminum (Al), silver (Ag), gold (Au), and titanium dioxide (TiO2). Accordingly, the reflective sheet 33 may reflect light, which is emitted from the light source 32 or reflected by the diffusion plate 36, forward. In addition, resin may be deposited or coated on the reflective sheet 33, and may serve to diffuse or spread light of the light source 32.

For example, a plurality of holes 33a may be aligned with the plurality of light sources 32 in the front-and-rear direction. That is, the number and position of the holes 33a may correspond to the number and position of the light sources 32.

The film 34 may be positioned in front of the reflective sheet 33. The film 34 may be disposed between the reflective sheet 33 and the diffusion plate 36. At least one hole 34a may be formed through the film 34, and the light source 32 may be positioned in the hole 34a. The film 34 may include a light-transmitting material. For example, the film 34 may include a resin material. For example, the film 34 may include a polyethylene (PE) material.

For example, a plurality of holes 34a may be aligned with the plurality of holes 33a in the front-and-rear direction. That is, the number and position of the holes 34a may correspond to the number and position of the light sources 32.

A spacer 35 may be provided on a front surface of the film 34. The spacer 35 may be formed as one body with the film 34. In other words, it is possible to prevent the separation of the spacer 35 from the film 34, which is caused by vibration or impact. For example, the film-type spacer 35 may be an injection molded part.

In addition, the spacer 35 may support a rear surface of the diffusion plate 36. That is, an air gap may be formed between the film 34 and the diffusion plate 36. The air gap may serve as a buffer, and light of the light source 32 may be widely spread by the air gap. For example, a distance OD between the reflective sheet 33 and the diffusion plate 36 may be about 10 mm. The distance OD may be referred to as an optical distance or an optical gap.

Further, the spacer 35 may have elasticity. The spacer 35 may be referred to as a supporter. For example, deformation of the diffusion plate 26 may occur when the display device is carried or stored (in particular, stored in a flat position). For example, when light is provided to the display panel 10, the temperature of the diffusion plate 36 may increase, which may cause deformation of the diffusion plate 36. For example, the deformation of the diffusion plate 36 may be sagging. When the sagging of the diffusion plate 36 occurs, the spacer 35 may support the diffusion plate 35. That is, the spacer 35 may maintain the distance OD, thereby preventing degradation in image quality of the display device.

The diffusion plate 36 may be positioned in front of the film 34. The diffusion plate 36 may be disposed between the film 34 and the optical sheet 40. The diffusion plate 36 may diffuse light of the light source 32.

The optical sheet 40 may be adjacent to or in contact with a front surface of the diffusion plate 36. The optical sheet 40 may include at least one sheet. For example, the optical sheet 40 may include a plurality of sheets having different functions, and the plurality of sheets may be in contact or in close contact with each other.

For example, the optical sheet 40 may include a first optical sheet 40a, a second optical sheet 40b, and a third optical sheet 40c. For example, the first optical sheet 40a may be a diffusion sheet, and the second optical sheet 40b and the third optical sheet 40c may be prism sheets. The diffusion sheet may prevent light from the diffusion plate 36 from being partially concentrated, thereby achieving uniform distribution of light. The prism sheet may collect light from the diffusion plate 36 to provide the light to the display panel 10 (see FIG. 2). The number and/or position of the diffusion sheet and the prism sheet may vary.

For example, the optical sheet 40 may further include a fourth optical sheet 40e positioned between the diffusion plate 36 and the first to third optical sheets 40a, 40b, and 40c. The fourth optical sheet 40e may change the wavelength or color of light of the light source 32. For example, the fourth optical sheet 40e may include a red-based phosphor and/or a green-based phosphor. In this case, the light source 32 may provide blue-based light, and the fourth optical sheet 40e may convert the blue light provided by the light source 32 to white light. The fourth optical sheet 40e may be referred to as a quantum dot (QD) sheet or a wide color gamut sheet.

Figure 5:
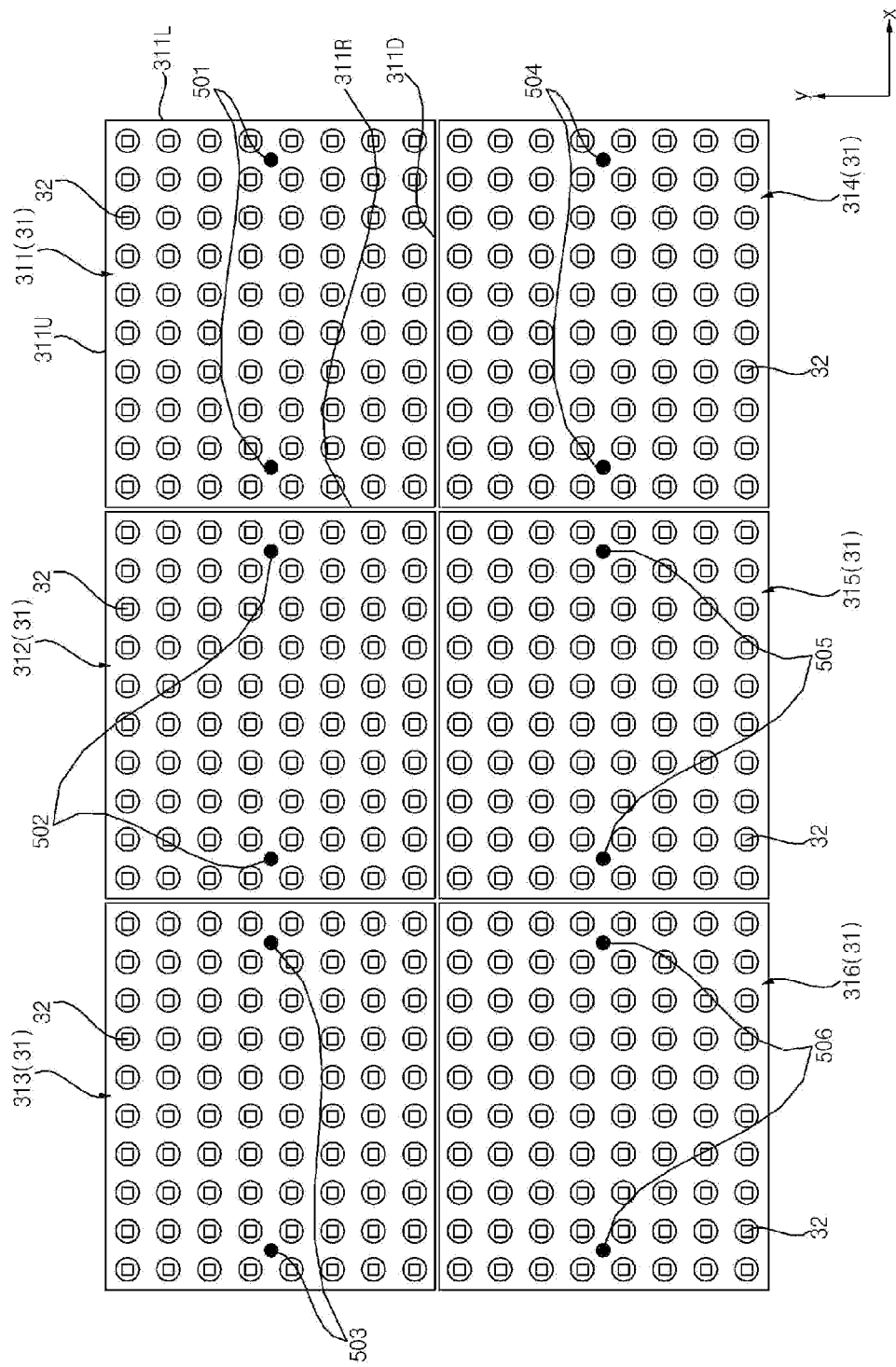

Referring to FIG. 2 and FIG. 5, the substrate 31 may be coupled to the frame 50 at the front of the frame 50.

For example, the substrate 31 may be configured as a single substrate. As another example, the substrate 31 may include a plurality of substrates 311, 312, 313, 314, 315, and 316 adjacent to each other. In this case, by taking thermal expansion of the substrate into consideration, a gap may be formed between the plurality of substrates 311, 312, 313, 314, 315, and 316.

A first substrate 311 may be a quadrangular-shaped substrate. That is, an upper side 311U and a lower side 311D of the first substrate 311 may extend in the left-and-right direction, and a left side 311L and a right side 311R of the first substrate 311 may extend in the up-and-down direction. For example, the plurality of substrates 311, 312, 313, 314, 315, and 316 may have the same shape and size.

The first substrate 311 may be adjacent to the first corner C1 (see FIG. 1). A third substrate 313 may be adjacent to the second corner C2 (see FIG. 1). A fourth substrate 314 may be adjacent to the fourth corner C4 (see FIG. 1). A sixth substrate 316 may be adjacent to the third corner C3 (see FIG. 1). A second substrate 312 may be positioned between the first substrate 311 and the third substrate 313. A fifth substrate 315 may be positioned between the fourth substrate 314 and the sixth substrate 316. The first substrate 311, the second substrate 312, the third substrate 313, the fourth substrate 314, the fifth substrate 315, and the sixth substrate 316 may be disposed on an imaginary horizontal plane (i.e., XY plane).

In this case, the frame 50 (see FIG. 2) may be divided into a plurality of areas (or regions), and the plurality of substrates 311, 312, 313, 314, 315, and 316 may be coupled to the plurality of areas, respectively. For example, an adhesive member (not shown), such as a double-sided tape, may be coupled to the frame 50 and the plurality of substrates 311, 312, 313, 314, 315, 316 between the frame 50 and the plurality of substrates 311, 312, 313, 314, 315, 316. In addition, a heat sink (not shown) may be disposed between the frame 50 and the substrate 31.

Meanwhile, the plurality of light sources 32 may be disposed at regular intervals on the plurality of substrates 311, 312, 313, 314, 315, and 316 in the left-and-right direction. In addition, the plurality of light sources 32 may be disposed at regular intervals on the plurality of substrates 311, 312, 313, 314, 315, and 316 in the up-and-down direction.

Figure 6:
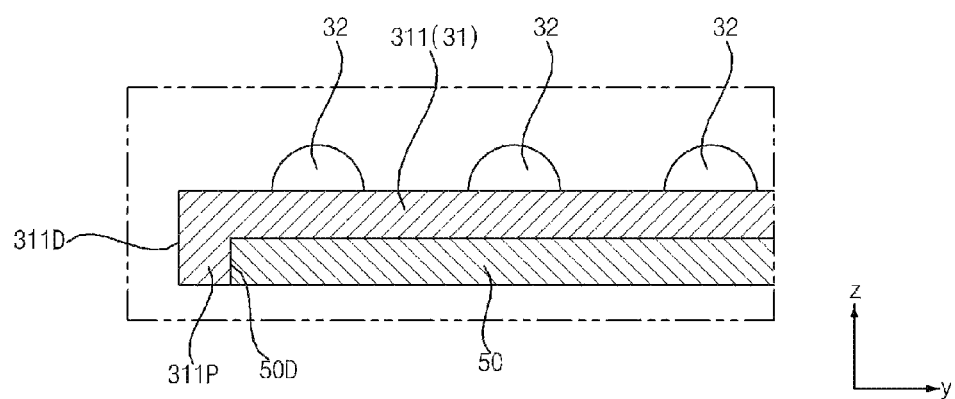

Referring to FIGS. 5 and 6, at least one first rib 311P may protrude rearward from at least one edge of the first substrate 311. For example, the first rib 311P may protrude rearward from the lower side 311D of the first substrate 311. In addition, the first rib 311P may be engaged by one side 50D of the frame 50. Accordingly, the first rib 311P may guide coupling of the frame 50 and the first substrate 311.

Meanwhile, the description of the first substrate 311 and the first rib 311P may be equally applied to the second to sixth substrates 312, 313, 314, 315, and 316, and ribs (not shown) provided thereon.

Figure 7:
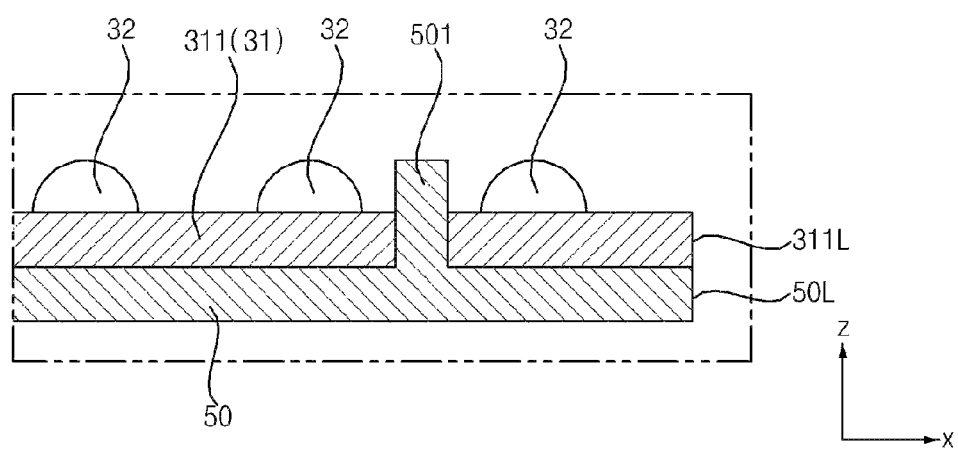

Referring to FIG. 5 and FIG. 7, a plurality of bosses 501, 502, 503, 504, 505, and 506 may protrude forward from a front surface of the frame 50, and may be spaced apart from each other. The boss may be referred to as a guide pin.

A first boss 501 may pass through the first substrate 311. A second boss 502 may pass through the second substrate 312. A third boss 503 may pass through the third substrate 313. A fourth boss 504 may pass through the fourth substrate 314. A fifth boss 505 may pass through the fifth substrate 315. A sixth boss 506 may pass through the sixth substrate 316.

Accordingly, the plurality of bosses 501, 502, 503, 504, 505, and 506 may guide coupling of the frame 50 and the plurality of substrates 311, 312, 313, 314, 315, 316.

Figure 8:
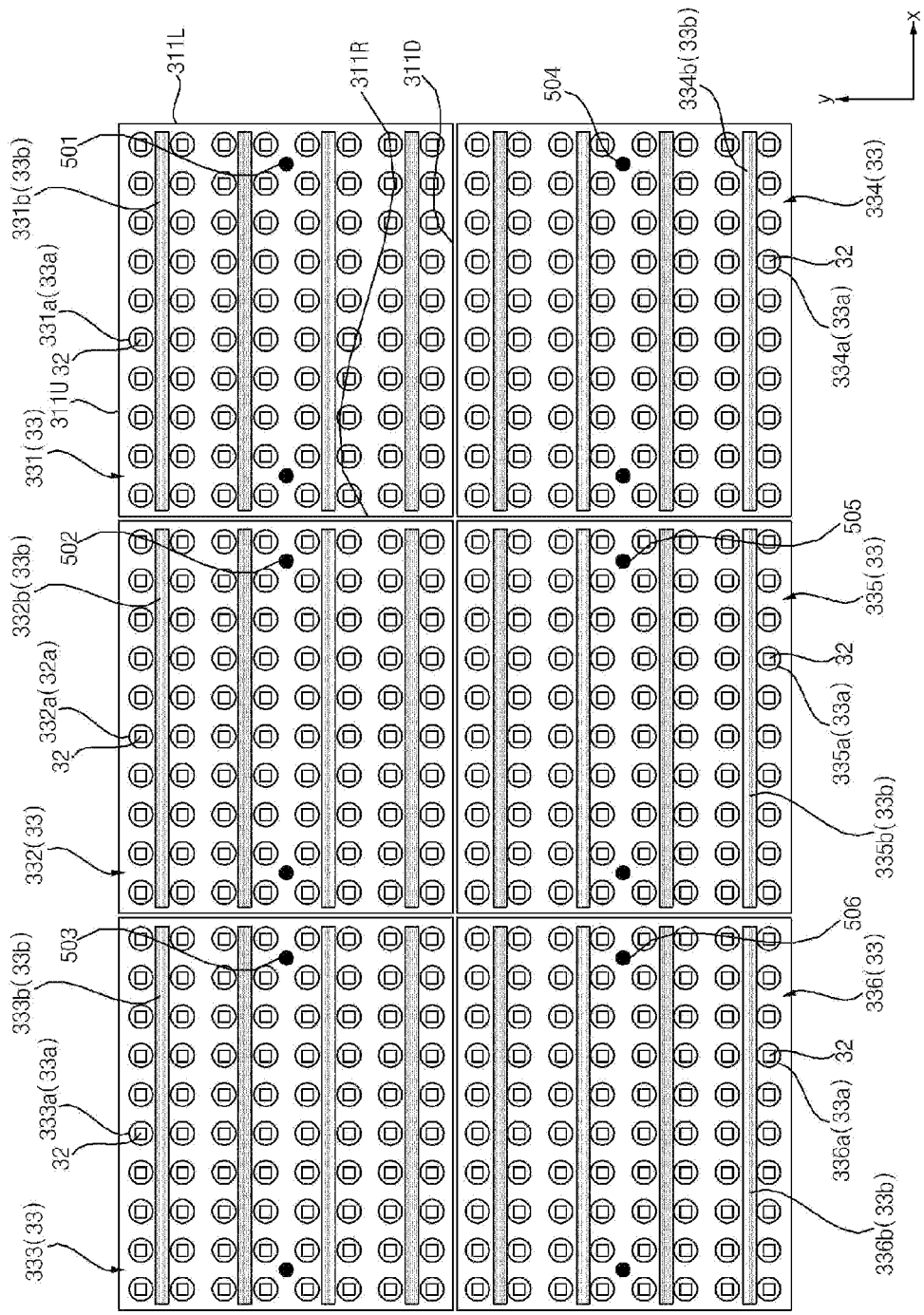
Figure 9:
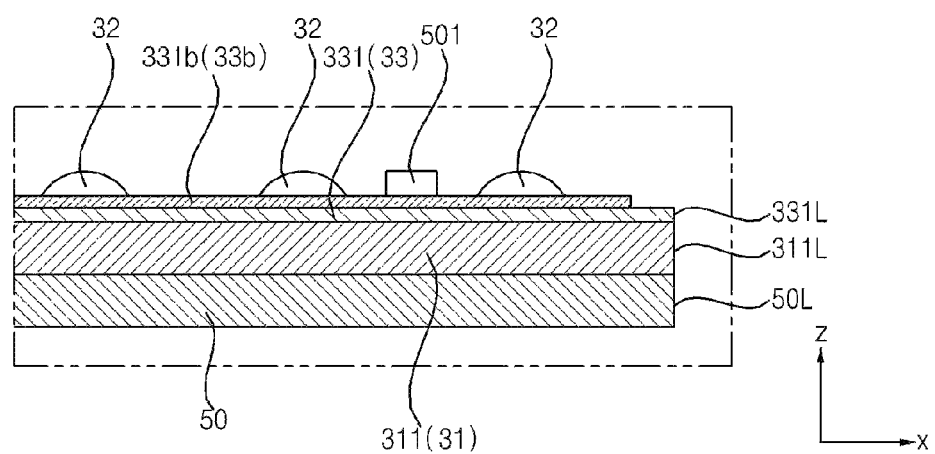

Referring to FIGS. 8 and 9, the reflective sheet 33 may be coupled to the substrate 31 at the front of the substrate 31. For example, an adhesive member (not shown), such as a double-sided tape, may be coupled to the reflective sheet 33 and the substrate 31 between the reflective sheet 33 and the substrate 31.

For example, the reflective sheet 33 may be configured as a single reflective sheet. As another example, the reflective sheet 33 may include a plurality of reflective sheets 331, 332, 333, 334, 335, and 336 adjacent to each other. In this case, by taking thermal expansion of the reflective sheet into consideration, a gap may be formed between the plurality of reflective sheets 331, 332, 333, 334, 335, and 336.

A first reflective sheet 331 may be a quadrangular-shaped sheet. That is, an upper side 331U and a lower side 331D of the first reflective sheet 331 may extend in the left-and-right direction, and a left side 331L and a right side 331R of the first reflective sheet 331 may extend in the up-and-down direction. For example, the plurality of reflective sheets 331, 332, 333, 334, 335, and 336 may have the same shape and size.

The first reflective sheet 331 may be coupled to a front surface of the first substrate 311. In this case, the first boss 501 may pass through the first reflective sheet 331. That is, the first boss 501 may guide coupling of the first substrate 311 and the first reflective sheet 331.

In addition, the size of the first reflective sheet 331 may be substantially the same as the size of the first substrate 311. A plurality of first sheet holes 331a may be formed through the first reflective sheet 331. The light source 32 may pass through the first sheet hole 331a. A first adhesive member 331b may be coupled to a front surface of the first reflective sheet 331. For example, a plurality of first adhesive members 331b may extend in the left-and-right direction, and may be spaced apart from each other in the up-and-down direction. For example, the first adhesive member 331b may be a double-sided tape.

A second reflective sheet 332 may be coupled to a front surface of the second substrate 312 (see FIG. 5). In this case, the second boss 502 may pass through the second reflective sheet 332. That is, the second boss 502 may guide coupling of the second substrate 312 and the second reflective sheet 332.

In addition, the size of the second reflective sheet 332 may be substantially the same as the size of the second substrate 312. A plurality of second sheet holes 332a may be formed through the second reflective sheet 332. The light source 32 may pass through the second sheet hole 332a. A second adhesive member 332b may be coupled to a front surface of the second reflective sheet 332. For example, a plurality of second adhesive members 332b may extend in the left-and-right direction, and may be spaced apart from each other in the up-and-down direction. For example, the second adhesive member 332b may be a double-sided tape.

A third reflective sheet 333 may be coupled to a front surface of the third substrate 313 (see FIG. 5). In this case, the third boss 503 may pass through the third reflective sheet 333. That is, the third boss 503 may guide coupling of the third substrate 313 and the third reflective sheet 333.

In addition, the size of the third reflective sheet 333 may be substantially the same as the size of the third substrate 313. A plurality of third sheet holes 333a may be formed through the third reflective sheet 333. The light source 32 may pass through the third sheet hole 333a. A third adhesive member 333b may be coupled to a front surface of the third reflective sheet 333. For example, a plurality of third adhesive members 333b may extend in the left-and-right direction, and may be spaced apart from each other in the up-and-down direction. For example, the third adhesive member 333b may be a double-sided tape.

A fourth reflective sheet 334 may be coupled to a front surface of the fourth substrate 314 (see FIG. 5). In this case, the fourth boss 504 may pass through the fourth reflective sheet 334. That is, the fourth boss 504 may guide coupling of the fourth substrate 314 and the fourth reflective sheet 334.

In addition, the size of the fourth reflective sheet 334 may be substantially the same as the size of the fourth substrate 314. A plurality of fourth sheet holes 334a may be formed through the fourth reflective sheet 334. The light source 32 may pass through the fourth sheet hole 334a. A fourth adhesive member 334b may be coupled to a front surface of the fourth reflective sheet 334. For example, a plurality of fourth adhesive members 334b may extend in the left-and-right direction, and may be spaced apart from each other in the up-and-down direction. For example, the fourth adhesive member 334b may be a double-sided tape.

A fifth reflective sheet 335 may be coupled to a front surface of the fifth substrate 315 (see FIG. 5). In this case, the fifth boss 505 may pass through the fifth reflective sheet 335. That is, the fifth boss 505 may guide coupling of the fifth substrate 315 and the fifth reflective sheet 335.

In addition, the size of the fifth reflective sheet 335 may be substantially the same as the size of the fifth substrate 315. A plurality of fifth sheet holes 335a may be formed through the fifth reflective sheet 335. The light source 32 may pass through the fifth sheet hole 335a. A fifth adhesive member 335b may be coupled to a front surface of the fifth reflective sheet 335. For example, a plurality of fifth adhesive members 335b may extend in the left-and-right direction, and may be spaced apart from each other in the up-and-down direction. For example, the fifth adhesive member 335b may be a double-sided tape.

A sixth reflective sheet 336 may be coupled to a front surface of the sixth substrate 316 (see FIG. 5). In this case, the sixth boss 506 may pass through the sixth reflective sheet 336. That is, the sixth boss 506 may guide coupling of the sixth substrate 316 and the sixth reflective sheet 336.

In addition, the size of the sixth reflective sheet 336 may be substantially the same as the size of the sixth substrate 316. A plurality of sixth sheet holes 336a may be formed through the sixth reflective sheet 336. The light source 32 may pass through the sixth sheet hole 336a. A sixth adhesive member 336b may be coupled to a front surface of the sixth reflective sheet 336. For example, a plurality of sixth adhesive members 336b may extend in the left-and-right direction, and may be spaced apart from each other in the up-and-down direction. For example, the sixth adhesive member 336b may be a double-sided tape.

Figure 10:
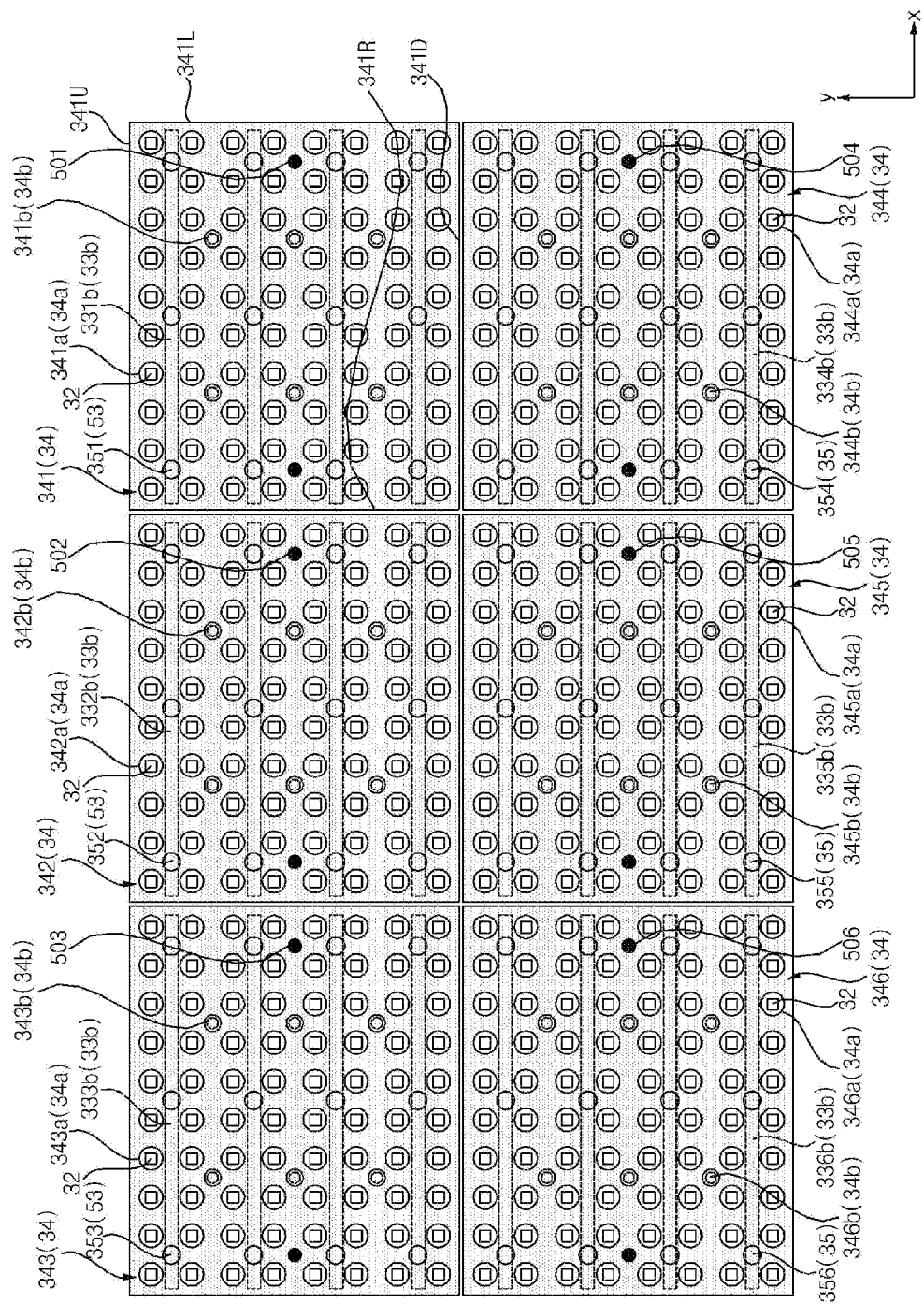
Figure 11:
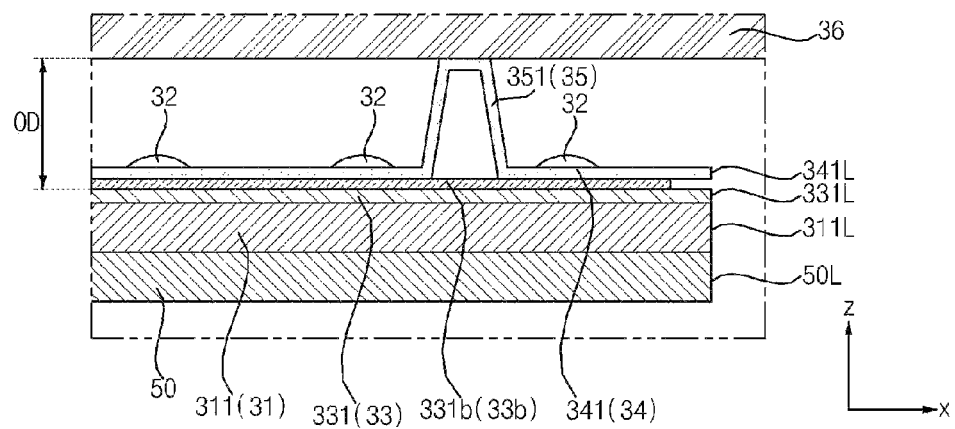

Referring to FIGS. 10 and 11, the film 34 may be coupled to the reflective sheet 33 at the front of the reflective sheet 33. That is, the adhesive members 331b, 332b, 333b, 334b, 335b, and 336b described above may be coupled to the film 34 and the reflective sheet 33 between the film 34 and the reflective sheet 33.

For example, the film 34 may be configured as a single film. As another example, the film 34 may include a plurality of films 341, 342, 343, 344, 345, and 346 adjacent to each other. In this case, by taking thermal expansion of the film into consideration, a gap may be formed between the plurality of films 341, 342, 343, 344, 345, and 346.

A first film 341 may be a quadrangular-shaped film. That is, an upper side 341U and a lower side 341D of the first film 341 may extend in the left-and-right direction, and a left side 341L and a right side 341R of the first film 341 may extend in the up-and-down direction. For example, the plurality of films 341, 342, 343, 344, 345, and 346 may have the same shape and size.

The first film 341 may be coupled to the front surface of the first reflective sheet 331. In this case, the first boss 501 may pass through the first film 341. That is, the first boss 501 may guide coupling of the first reflective sheet 331 and the first film 341. In addition, the size of the first film 341 may be substantially the same as the size of the first reflective sheet 331. A plurality of first film holes 341a may be formed through the first film 341. The light source 32 may pass through the first film hole 341a.

A second film 342 may be coupled to the front surface of the second reflective sheet 332 (see FIG. 8). In this case, the second boss 502 may pass through the second film 342. That is, the second boss 502 may guide coupling of the second reflective sheet 332 and the second film 342. In addition, the size of the second film 342 may be substantially the same as the size of the second reflective sheet 332. A plurality of second film holes 342a may be formed through the second film 342. The light source 32 may pass through the second film hole 342a.

A third film 343 may be coupled to the front surface of the third reflective sheet 333 (see FIG. 8). In this case, the third boss 503 may pass through the third film 343. That is, the third boss 503 may guide coupling of the third reflective sheet 333 and the third film 343. In addition, the size of the third film 343 may be substantially the same as the size of the third reflective sheet 333. A plurality of third film holes 343a may be formed through the third film 343. The light source 32 may pass through the third film hole 343a.

A fourth film 344 may be coupled to the front surface of the fourth reflective sheet 334 (see FIG. 8). In this case, the fourth boss 504 may pass through the fourth film 344. That is, the fourth boss 504 may guide coupling of the fourth reflective sheet 334 and the fourth film 344. In addition, the size of the fourth film 344 may be substantially the same as the size of the fourth reflective sheet 334. A plurality of fourth film holes 344a may be formed through the fourth film 344. The light source 32 may pass through the fourth film hole 344a.

A fifth film 345 may be coupled to the front surface of the fifth reflective sheet 335 (see FIG. 8). In this case, the fifth boss 505 may pass through the fifth film 345. That is, the fifth boss 505 may guide coupling of the fifth reflective sheet 335 and the fifth film 345. In addition, the size of the fifth film 345 may be substantially the same as the size of the fifth reflective sheet 335. A plurality of fifth film holes 345a may be formed through the fifth film 345. The light source 32 may pass through the fifth film hole 345a.

A sixth film 346 may be coupled to the front surface of the sixth reflective sheet 336 (see FIG. 8). In this case, the sixth boss 506 may pass through the sixth film 346. That is, the sixth boss 506 may guide coupling of the sixth reflective sheet 336 and the sixth film 346. In addition, the size of the sixth film 346 may be substantially the same as the size of the sixth reflective sheet 336. A plurality of sixth film holes 346a may be formed through the sixth film 346. The light source 32 may pass through the sixth film hole 346a.

Meanwhile, the spacer 35 may protrude toward the diffusion plate 36, namely, forward from each of the plurality of films 341, 342, 343, 344, 345, and 346. In other words, the spacer 35 may be depressed or pressed forward from a rear surface of each of the plurality of films 341, 342, 343, 344, 345, and 346. A plurality of spacers 351, 352, 353, 354, 355, and 356 may be left-right symmetric with respect to a vertical line passing through a center of the second film 342 and a center of the fifth film 345.

A plurality of first spacers 351 may be formed as one body with the first film 341. Front ends of the plurality of first spacers 351 may support the rear surface of the diffusion plate 36. For example, the plurality of first spacers 351 may be spaced apart from each other along the first adhesive member 331b.

A plurality of second spacers 352 may be formed as one body with the second film 342. Front ends of the plurality of second spacers 352 may support the rear surface of the diffusion plate 36. For example, the plurality of second spacers 352 may be spaced apart from each other along the second adhesive member 332b.

A plurality of third spacers 353 may be formed as one body with the third film 343. Front ends of the plurality of third spacers 353 may support the rear surface of the diffusion plate 36. For example, the plurality of third spacers 353 may be spaced apart from each other along the third adhesive member 333b.

A plurality of fourth spacers 354 may be formed as one body with the fourth film 344. Front ends of the plurality of fourth spacers 354 may support the rear surface of the diffusion plate 36. For example, the plurality of fourth spacers 354 may be spaced apart from each other along the fourth adhesive member 334b.

A plurality of fifth spacers 355 may be formed as one body with the fifth film 345. Front ends of the plurality of fifth spacers 355 may support the rear surface of the diffusion plate 36. For example, the plurality of fifth spacers 355 may be spaced apart from each other along the fifth adhesive member 335b.

A plurality of sixth spacers 356 may be formed as one body with the sixth film 346. Front ends of the plurality of sixth spacers 356 may support the rear surface of the diffusion plate 36. For example, the plurality of sixth spacers 356 may be spaced apart from each other along the sixth adhesive member 336b.

Accordingly, the diffusion plate 36 may be supported by the plurality of spacers 351, 352, 353, 354, 355, and 356.

Figure 12:
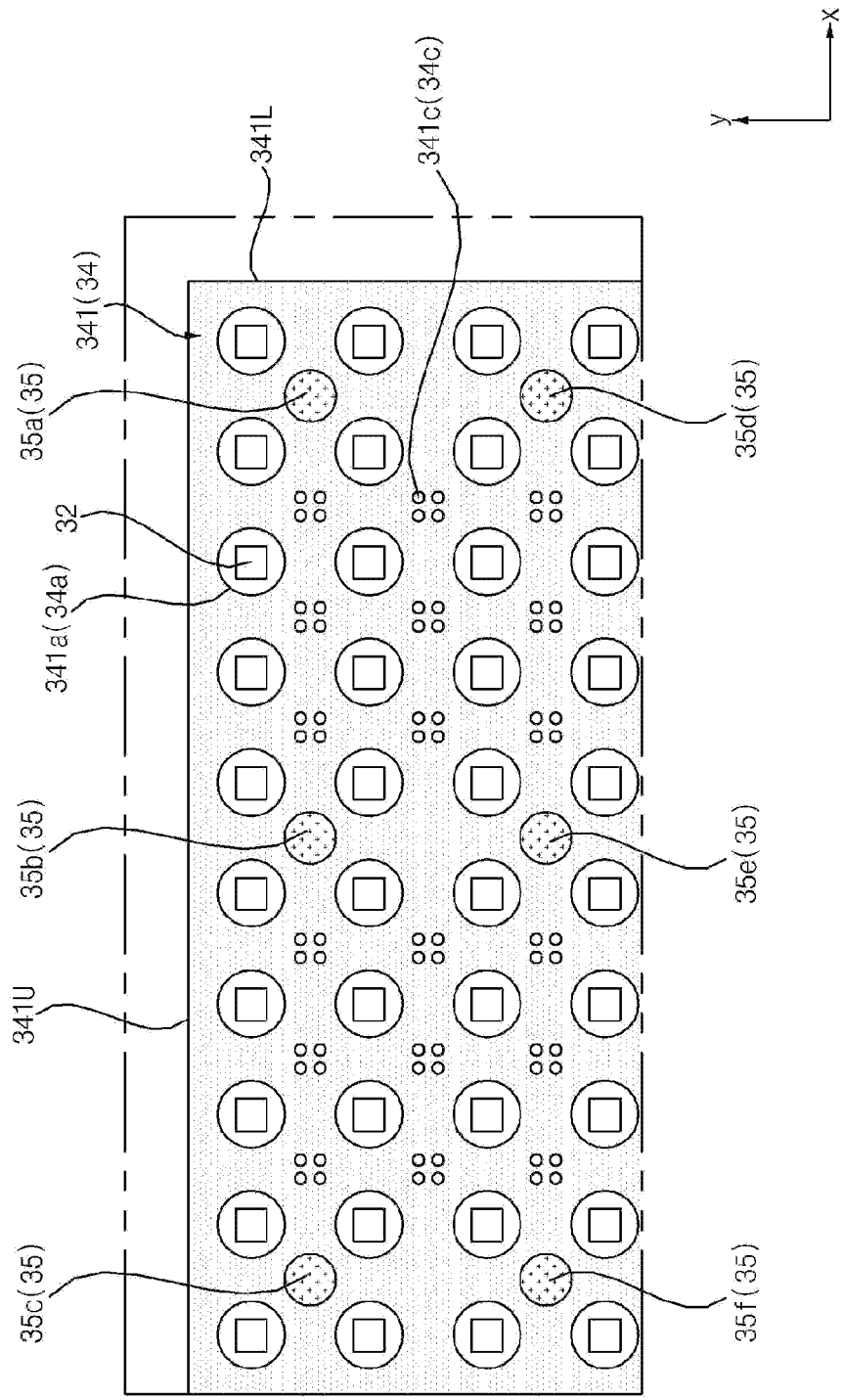
Figure 13:
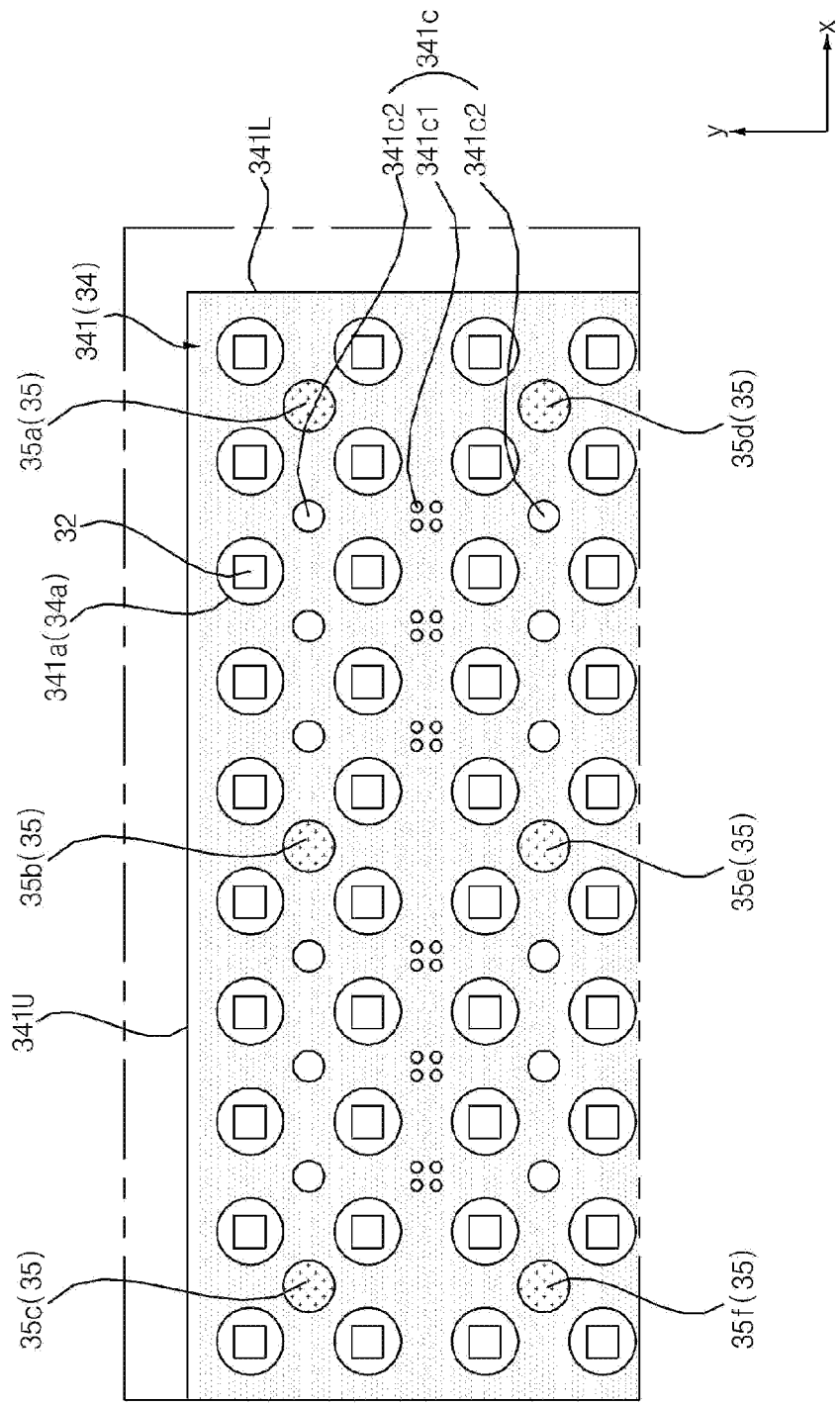

Referring to FIGS. 12 and 13, an area corresponding to the light source 32 of the display panel may be bluish, and the remaining area of the display panel may be yellowish. That is, there may be a color difference between the two areas of the display panel.

In view of this, the film 34 may contain a fluorescent dye or a light-absorbing dye. That is, the film 34 may have a certain color. For example, a blue-based fluorescent dye or a light-absorbing dye may be applied to the film 34.

Accordingly, it is possible to improve (or reduce) the color difference between the area corresponding to the light source 32 of the display panel and the remaining area of the display panel. Further, it is possible to enhance color gamut.

Meanwhile, a plurality of holes 34c may be formed through the film 34, and may be positioned between the plurality of light sources 32. In this case, the reflective sheet 33 may be exposed to the front of the film 34 through the plurality of holes 34c. Alternatively, the substrate 31 may be exposed to the front of the film 34 through the plurality of holes 34c, and an exposed portion of the substrate 31 may be coated with a reflective material. Accordingly, it is possible to improve image quality by adjusting the position and size of the holes 34c.

In one example shown in FIG. 12, a plurality of first holes 341c may be formed through the first film 341, and may have the same size and shape. That is, four adjacent holes of the same size may form one group, and a plurality of groups may be positioned between the light sources 32. Here, each group may be disposed at a center of an area defined by four light sources 32 adjacent to each other.

In another example shown in FIG. 13, a plurality of first holes 341c may be formed through the first film 341, and may have different sizes and shapes. That is, four adjacent holes of the same size may form a first group 341c1, and two holes opposite each other with respect to the first group 341c1 may form a second group 341c2. Here, the hole belonging to the second group 341c2 may be greater in size than the hole belonging to the first group 341c1. In addition, the number of holes belonging to the second group 341c2 may be less the number of holes belonging to the first group 341c1. Each group may be disposed at a center of an area defined by four light sources 32 adjacent to each other.

Figure 14:
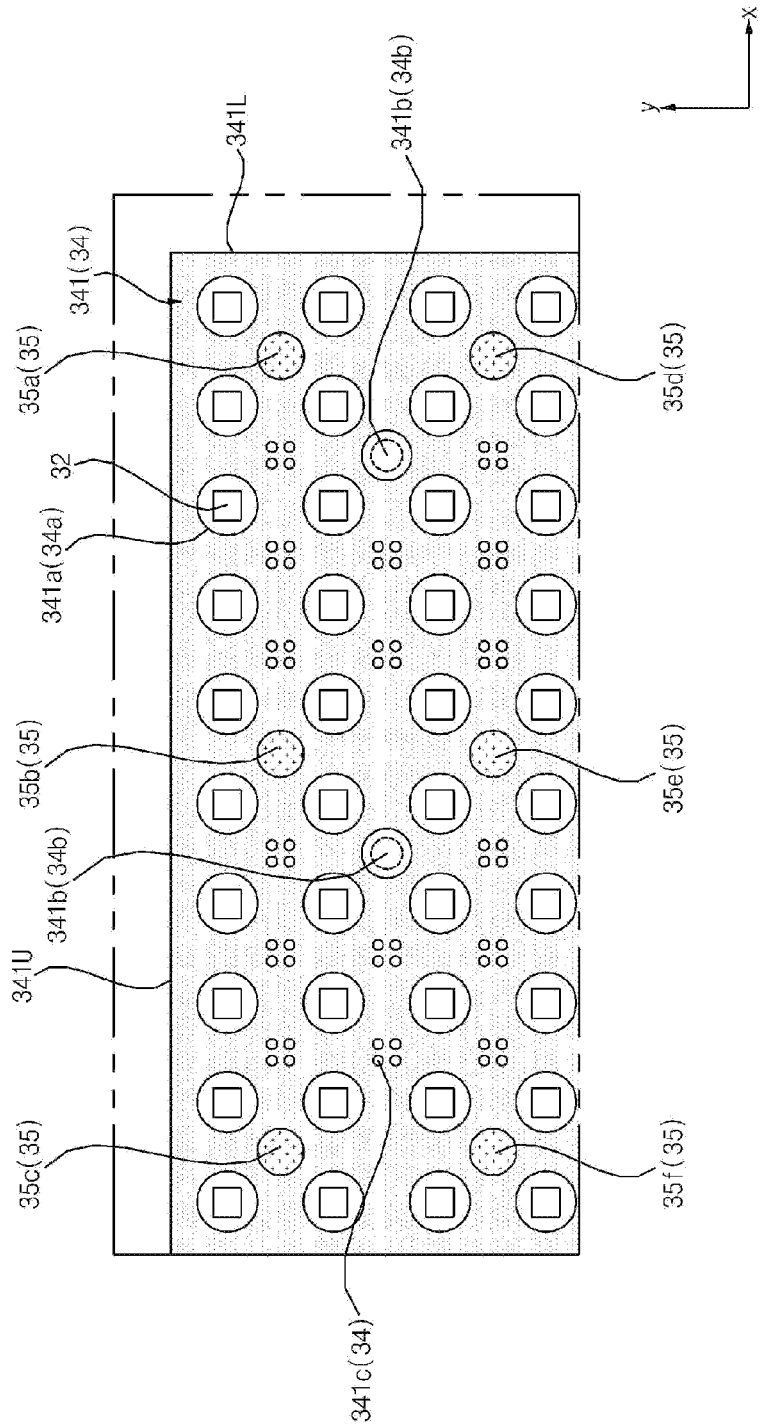

Referring to FIG. 11 and FIG. 14, a fastening member 34b, such as a screw, may sequentially pass through the film 34, the reflective sheet 33, and the substrate 31, so as to be fastened to the frame 50. For example, a plurality of fastening members 34b may be positioned between the plurality of light sources 32.

Accordingly, the fastening member 34b may allow the film 34, the reflective sheet 33, and the substrate 31 to be fixed or secured to the frame 50.

Meanwhile, the fastening member 34b may have a white color or a blue-based color. Accordingly, it is possible to minimize a color difference caused by the fastening member 34b. In addition, a reflective material may be coated on a surface of the fastening member 34b. Thus, it is possible to minimize a decrease in reflectance due to the fastening member 34b.

Figure 15:
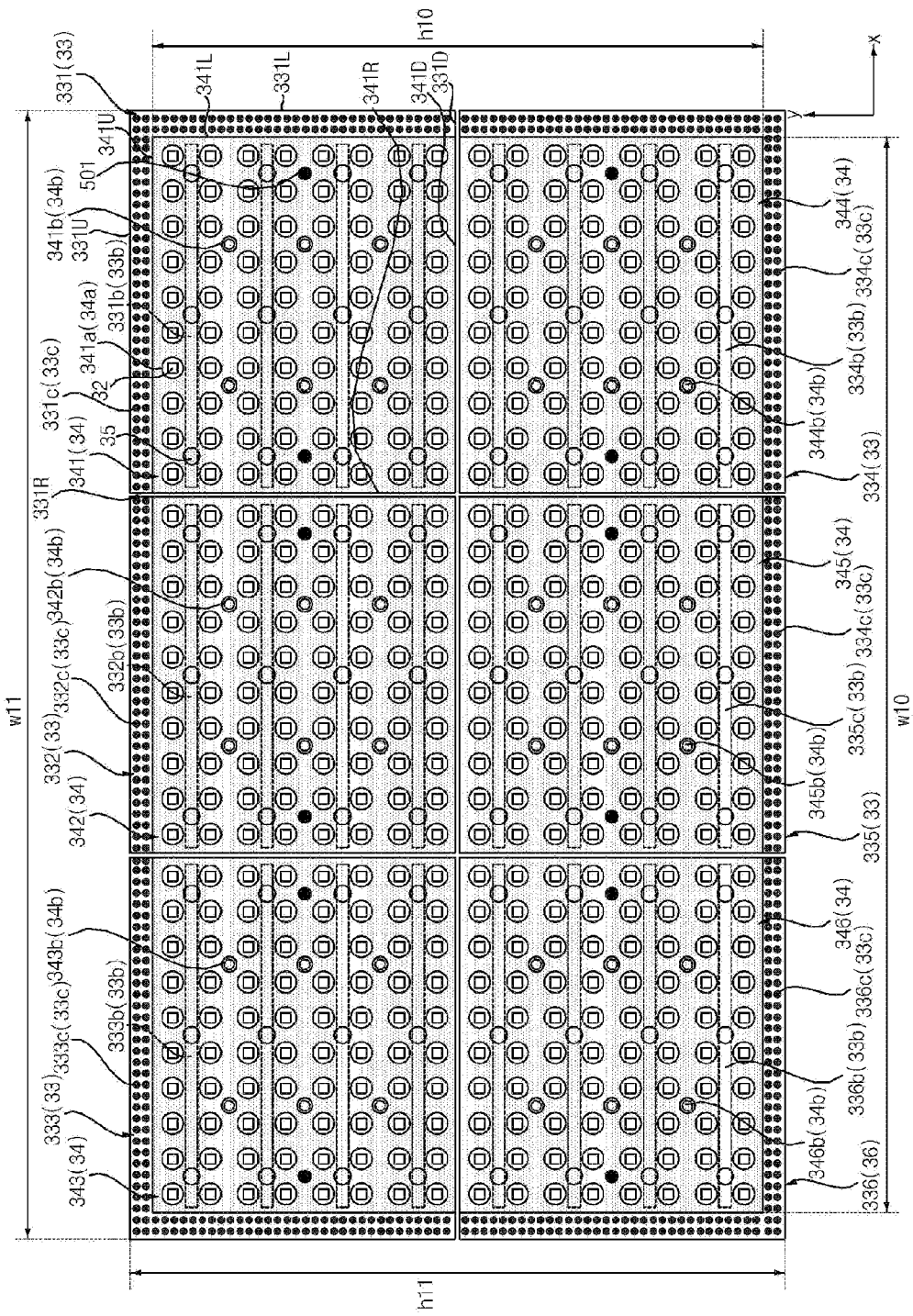

Referring to FIG. 15, a width w10 of the film 34 and a width w11 of the reflective sheet 33 may be defined in the left-and-right direction. A height h10 of the film 34 and a height h11 of the reflective sheet 33 may be defined in the up-and-down direction. For example, the width w10 of the film 34 may be less than the width w11 of the reflective sheet 33, and the height h10 of the film 34 may be less than the height h11 of the reflective sheet 33. That is, edges of the reflective sheet 33 may be positioned outside edges of the film 34.

In this case, an optical pattern 33c may be positioned between the edges of the film 34 and the edges of the reflective sheet 33, and may be disposed or formed on the reflective sheet 33. A first optical pattern 331c may be positioned between upper and left sides of the first film 341 and upper and left sides of the first reflective sheet 331. A second optical pattern 332c may be positioned between an upper side of the second film 342 and an upper side of the second reflective sheet 332. A third optical pattern 333c may be positioned between upper and right sides of the third film 343 and upper and right sides of the third reflective sheet 333. A fourth optical pattern 334c may be positioned between lower and left sides of the fourth film 344 and lower and left sides of the fourth reflective sheet 334. A fifth optical pattern 335c may be positioned between a lower side of the fifth film 345 and a lower side of the fifth reflective sheet 335. A sixth optical pattern 336c may be positioned between lower and right sides of the sixth film 346 and lower and right sides of the sixth reflective sheet 336.

The optical pattern 33c may come in various shapes. For example, the optical pattern 33c may include a phosphor. For example, the optical pattern 33c may include a yellow-based phosphor. Accordingly, the optical pattern 33c may reduce a color difference between the edges of the film 34 and the edges of the reflective sheet 33, thereby improving the image quality. The optical pattern may be referred to as a fluorescence pattern.

Meanwhile, the width w10 and the height h10 of the film 34 may be less than the width and the height of the substrate 31 (see FIG. 5). That is, edges of the substrate 31 may be positioned outside edges of the film 34. In addition, the reflective sheet 33 may not be provided (i.e., omitted) between the edges of the film 34 and the edges of the substrate 31. In this case, the optical pattern 33c may be positioned between the edges of the film 34 and the edges of the substrate 31, and may be disposed or formed on the substrate 31. Hereinafter, for the sake of brevity, a case in which the optical pattern 33c is disposed or formed on the reflective sheet 33 will be described, and this description may be equally applied to a case in which the optical pattern 33c is disposed or formed on the substrate 31.

Figure 16:
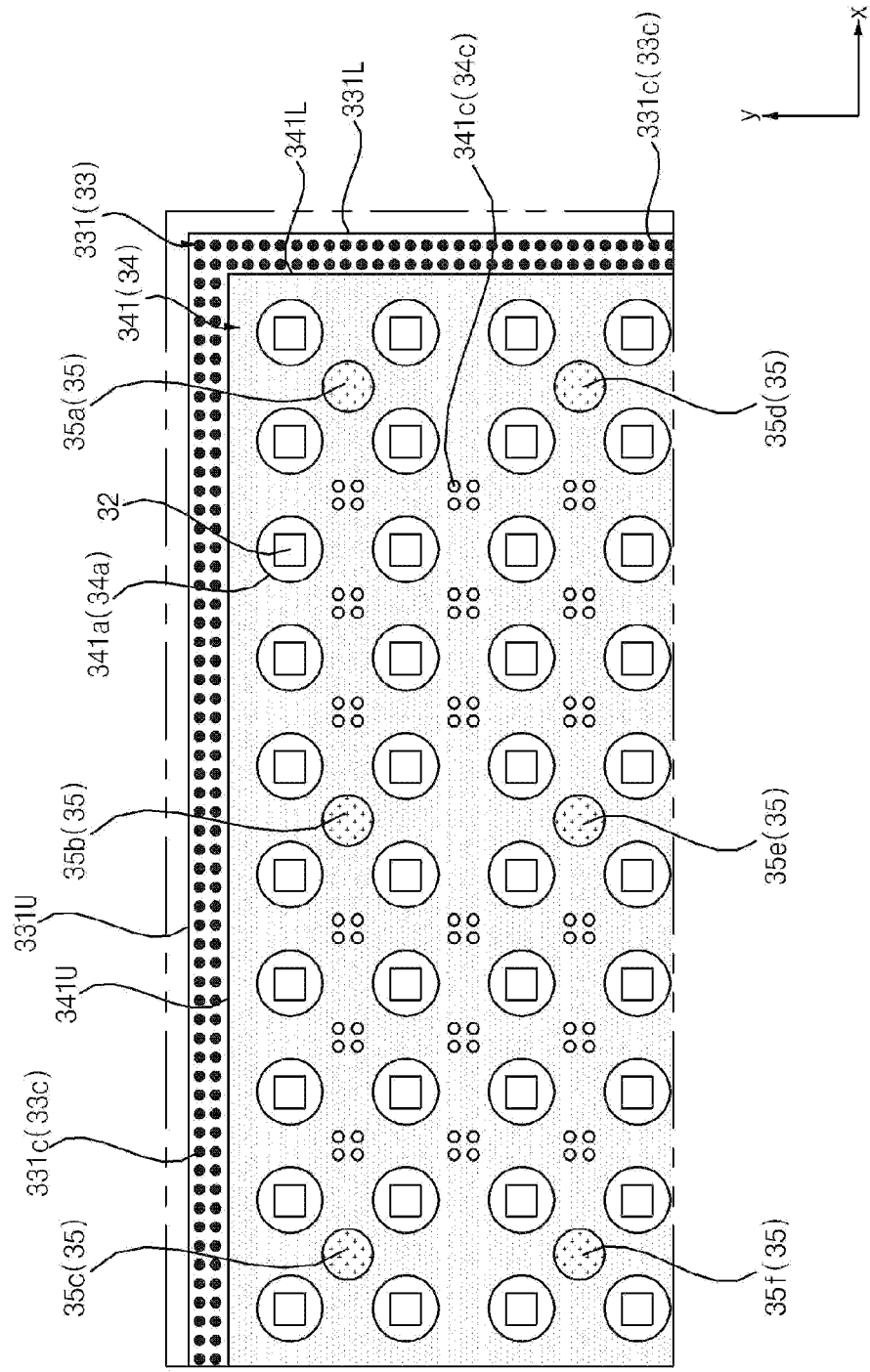

Referring to FIG. 16, the first optical pattern 331c may include a plurality of dots. The plurality of dots may have the same shape and size. For example, each of the plurality of dots may be a circular-shaped dot. First dots of the plurality of dots may be adjacent to the left side 331L and the upper side 331U of the first reflective sheet 331, and may be sequentially arranged along the left side 331L and the upper side 331U. Second dots of the plurality of dots may be adjacent to the left side 341L and the upper side 341U of the first film 341, and may be sequentially arranged along the left side 341L and the upper side 341U.

Accordingly, the first optical pattern 331c may reduce a color difference between the left and upper sides 341L and 341U of the first film 341 and the left and upper sides 331L and 331U of the first reflective sheet 331, thereby improving the image quality.

Meanwhile, the description of the first optical pattern 331c may be equally applied to the second to sixth optical patterns 332c, 333c, 334c, 335c, and 336c (see FIG. 15).

Figure 17:
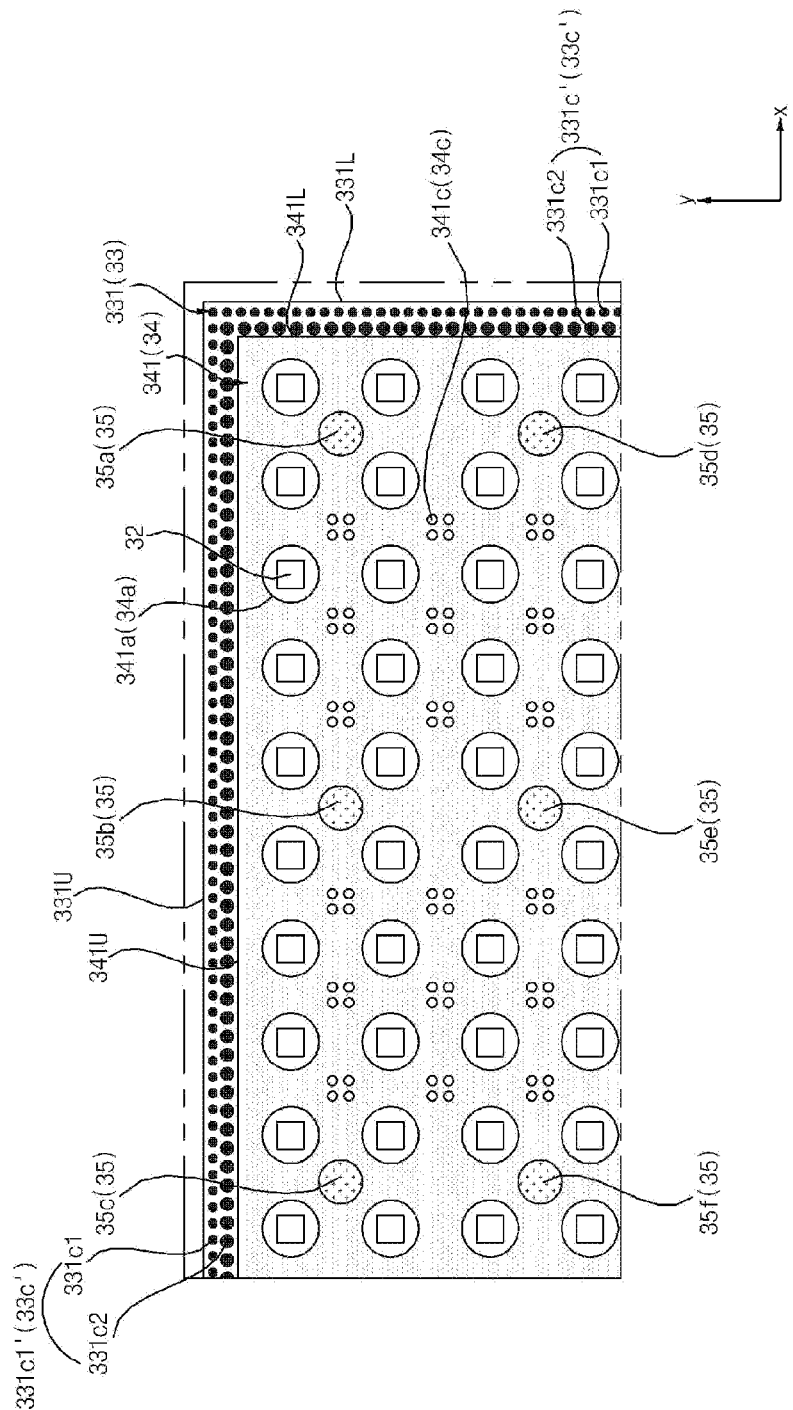

Referring to FIG. 17, a first optical pattern 331c' may include a plurality of dots. For example, each of the plurality of dots may be a circular-shaped dot. First dots 331c1 of the plurality of dots may be adjacent to the left side 331L and the upper side 331U of the first reflective sheet 331, and may be sequentially arranged along the left side 331L and the upper side 331U. Second dots 331c2 of the plurality of dots may be adjacent to the left side 341L and the upper side 341U of the first film 341, and may be sequentially arranged along the left side 341L and the upper side 341U.

A distance between the second dots 331c2 and the light sources 32 may be less than a distance between the first dots 331c1 and the light sources 32. Each of the second dots 331c2 may be greater in size than each of the first dots 331c1.

Accordingly, the first optical pattern 331c' may further reduce a color difference between the left and upper sides 341L and 341U of the first film 341 and the left and upper sides 331L and 331U of the first reflective sheet 331, thereby further improving the image quality.

Meanwhile, the description of the first optical pattern 331' may be equally applied to the other optical patterns.

Figure 18:
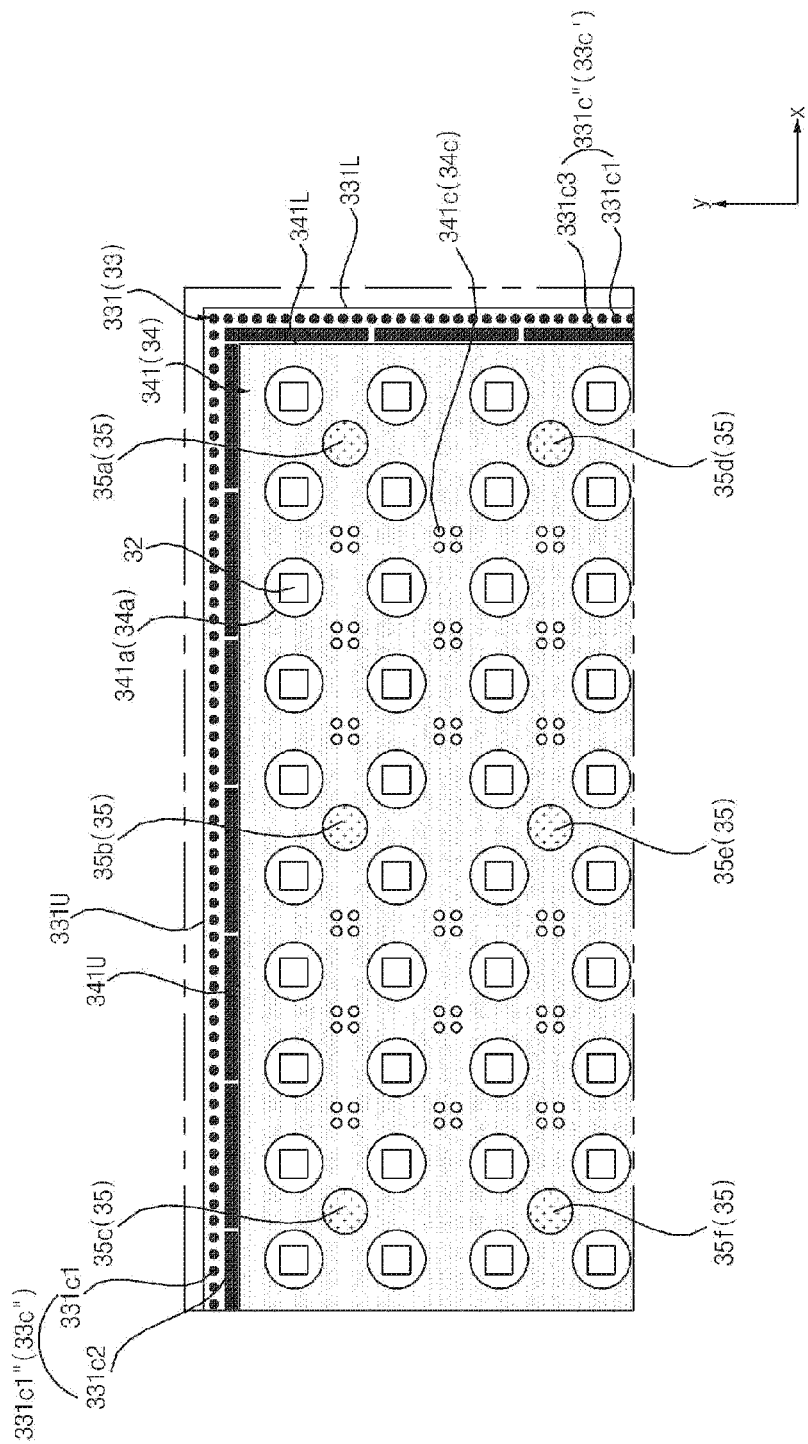

Referring to FIG. 18, a first optical pattern 331c" may include a plurality of dots 331c1 and a plurality of lines 331c3. For example, each of the plurality of dots 331c1 may be a circular-shaped dot, and each of the plurality of lines 331c3 may be a rectangular-shaped band. The plurality of dots 331c1 may be adjacent to the left side 331L and the upper side 331U of the first reflective sheet 331, and may be sequentially arranged along the left side 331L and the upper side 331U. The plurality of lines 331c3 may be adjacent to the left side 341L and the upper side 341U of the first film 341, and may be sequentially arranged along the left side 341L and the upper side 341U.

A distance between the lines 331c3 and the light sources 32 may be less than a distance between the dots 331c1 and the light sources 32. A length of each of the lines 331c3 may be greater than a diameter of each of the dots 331c1. For example, the length of each of the lines 331c3 may be greater than a length of an area in which multiple dots 331c1 are sequentially arranged.

Accordingly, the first optical pattern1 331c" may further reduce a color difference between the left and upper sides 341L and 341U of the first film 341 and the left and upper sides 331L and 331U of the first reflective sheet 331, thereby further improving the image quality.

Meanwhile, the description of the first optical pattern 331c" may be equally applied to the other optical patterns.

Referring to FIG. 19, a spacer 35' may have a cylindrical shape. That is, an outer diameter Da' of the spacer 35' may be constant. A distance OD between the reflective sheet 33 and the diffusion plate 36 may be equal to the sum of a height ha of the spacer 35', a thickness ta of the film 34, and a thickness of the adhesive member 33b.

In addition, a front end 350' of the spacer 35' may be formed flat, and may support the rear surface of the diffusion plate 36. The spacer 35' may be in surface contact with the rear surface of the diffusion plate 36. Accordingly, the spacer 35' may securely support the rear surface of the diffusion plate 36.

Referring to FIG. 20, the spacer 35 may have a truncated cone shape. That is, an outer diameter Da of the spacer 35 may decrease toward the front. A distance OD between the reflective sheet 33 and the diffusion plate 36 may be equal to the sum of a height ha of the spacer 35, a thickness ta of the film 34, and a thickness of the adhesive member 33b.

In addition, a front end 350 of the spacer 35 may be formed flat, and may support the rear surface of the diffusion plate 36. The spacer 35 may be in surface contact with the rear surface of the diffusion plate 36. Accordingly, the spacer 35 may securely support the rear surface of the diffusion plate 36.

Referring to FIG. 21, a convex portion 35p may protrude outward in a convex shape from a lateral surface of the spacer 35, and may extend along a circumferential direction of the spacer 35. The convex portion 35p may be positioned between the front end 350 of the spacer 35 and a rear end of the spacer 35.

Accordingly, the convex portion 35p may provide an elastic force to the spacer 35. That is, the spacer 35 having the convex portion 35p may be compressed by the diffusion plate 36. The convex portion 35p may be referred to as an elastic portion 35p.

Meanwhile, the convex portion 35p may be provided on a lateral surface of the spacer 35' described above with reference to FIG. 19.

Referring to FIG. 22, a concave portion 35q may be recessed inward in a concave shape from a lateral surface of the spacer 35, and may extend along a circumferential direction of the spacer 35. The concave portion 35q may be positioned between the front end 350 of the spacer 35 and a rear end of the spacer 35.

Accordingly, the concave portion 35q may provide an elastic force to the spacer 35. That is, the spacer 35 having the concave portion 35q may be compressed by the diffusion plate 36. The concave portion 35q may be referred to as an elastic portion 35q.

Meanwhile, the concave portion 35q may be provided on a lateral surface of the spacer 35' described above with reference to FIG. 19.

Referring to FIG. 23, a spacer 35" may have an overall cylindrical shape or a truncated cone shape. That is, an outer diameter Da" of the spacer 35" may be constant or may decrease toward the front.

A support portion 350" of the spacer 35" may be spaced rearward from the diffusion plate 36, and may face the rear surface of the diffusion plate 36. A protruding portion 35s may protrude toward the diffusion plate 36, namely, forward from the support portion 350". In other words, the protruding portion 35s may be depressed or pressed forward from a rear surface of the support portion 350". A distance OD between the reflective sheet 33 and the diffusion plate 36 may be equal to the sum of a distance hc between the support portion 350" and a rear end of the spacer 35", a height hd of the protruding portion 35s, a thickness ta of the film 34, and a thickness of the adhesive member 33b.

In addition, the protruding portion 35s may be formed flat, and may support the rear surface of the diffusion plate 36. The protruding portion 35s may be in surface contact with the rear surface of the diffusion plate 36.

Accordingly, the protruding portion 35s may provide an elastic force to the spacer 35". That is, the spacer 35" having the protruding portion 35s may be compressed by the diffusion plate 36. The protruding portion 35s may be referred to as an elastic portion 35s.

Referring to FIG. 24, a spacer 35''' may have an overall cylindrical shape or a truncated cone shape. That is, an outer diameter Da" of the spacer 35" may be constant or may decrease toward the front. A distance OD between the reflective sheet 33 and the diffusion plate 36 may be equal to the sum of a height ha of the spacer 35''', a thickness ta of the film 34, and a thickness of the adhesive member 33b.

In addition, a front end 350''' of the spacer 35''' may be formed flat, and may support the rear surface of the diffusion plate 36. The spacer 35''' may be in surface contact with the rear surface of the diffusion plate 36. Accordingly, the spacer 35''' may securely support the rear surface of the diffusion plate 36.

A round (or rounded) portion 35r may define a rear end of the spacer 35''', and may be connected to the film 34. The round portion 35r may extend along a circumferential direction of the spacer 35'''. The round portion 35r may have a constant curvature (1/ra) with respect to a center of curvature located outside the round portion 35r. The round portion 35r may extend along the circumferential direction of the spacer 35'''.

Accordingly, the round portion 35r may provide an elastic force to the spacer 35'''. That is, the spacer 35''' having the round portion 35r may be compressed by the diffusion plate 36. The round portion 35r may be referred to as an elastic portion 35r.

Meanwhile, at least one of the elastic portions 35p, 35q, 35s, and 35r described with reference to FIGS. 21 to 24 may be applied to a supporter having another one.

Referring to FIGS. 1 to 24, a display device may include: a display panel; a frame positioned behind the display panel; a substrate positioned between the display panel and the frame, and coupled to the frame; a plurality of light sources positioned on the substrate and providing light to the display panel; a diffusion plate positioned between the display panel and the plurality of light sources; and a film coupled to the substrate between the diffusion plate and the substrate, and through which the plurality of light sources pass, wherein the film may include a spacer depressed toward the diffusion plate from a rear surface of the film and supporting the diffusion plate.

The display device may further include an optical sheet positioned between the display panel and the diffusion plate, and including a phosphor, wherein the film may comprises a blue-based fluorescent dye or a light-absorbing dye.

The display device may further include a reflective sheet positioned between the film and the substrate, coupled to the film and the substrate, and through which the plurality of light sources pass, wherein the film may include a light-transmitting material.

The film may further include a plurality of holes formed through the film and positioned between the plurality of light sources.

Edges of the substrate may be positioned outside edges of the film, wherein the substrate may further include an optical pattern which is positioned between the edges of the substrate and the edges of the film, which is formed on the substrate, and which includes a yellow-based phosphor.

Edges of the substrate may be positioned outside edges of the film, wherein the reflective sheet may further include an optical pattern which is positioned between the edges of the substrate and the edges of the film, which is formed on the reflective sheet, and which includes a yellow-based phosphor.

The optical pattern may further include: a plurality of first dots adjacent to the edges of the reflective sheet and arranged along the edges of the reflective sheet; and a plurality of second dots adjacent to the edges of the film and arranged along the edges of the film, wherein the plurality of light sources may be closer to the plurality of second dots than the plurality of first dots, wherein a size of each of the plurality of second dots may be equal to or greater than a size of each of the plurality of first dots.

The optical pattern may further include: a plurality of dots adjacent to the edges of the reflective sheet and arranged along the edges of the reflective sheet; and a plurality of lines adjacent to the edges of the film and arranged along the edges of the film, wherein the plurality of light sources may be closer to the plurality of lines than the plurality of dots, wherein a length of each of the plurality of lines may be greater than a diameter of each of the plurality of dots.

The spacer may have a cylindrical shape or a truncated cone shape, a front end of the spacer may be formed flat and may support a rear surface of the diffusion plate.

The spacer may further include an elastic portion positioned between a front end of the spacer and a rear end of the spacer, protruded convexly outward or recessed concavely inward from a lateral surface of the spacer, wherein the elastic portion may extend along a periphery of the spacer and may have elasticity.

The spacer may further include: a support portion spaced rearward from a rear surface of the diffusion plate, and facing the rear surface of the diffusion plate; and an elastic portion depressed toward the diffusion plate from a rear surface of the support portion, and supporting the rear surface of the diffusion plate, wherein the elastic portion may include a flat front end and may have elasticity.

The spacer may further include an elastic portion which forms a rear end of the spacer and which is rounded, wherein the elastic portion may extend along a periphery of the spacer and may have elasticity.

The spacer may include a plurality of spacers disposed between the plurality of light sources, and left-right symmetric with respect to a vertical line passing through a center of the film.

The substrate may further include a plurality of substrates spaced apart from each other while being adjacent to each other, wherein the film may further include a plurality of films aligned with the plurality of substrates in a front-and-rear direction, wherein the plurality of substrates may each include at least one rib protruding rearward from an edge of each of the plurality of substrates, and engaged by one side of the frame, wherein the frame may further include a plurality of bosses protruding forward from a front surface of the frame, and passing through the plurality of substrates and the plurality of films.

The display device may further include a fastening member passing through the film and the substrate, and fixed to the frame, wherein the fastening member may have a white or blue color, a reflective material is coated on a surface of the fastening member.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings, and a configuration "B" described in another embodiment of the disclosure and the drawings may be combined with each other. Namely, although the combination between the configurations is not directly described, the combination is possible except in the case where it is described that the combination is impossible.

The above detailed description is to be construed in all aspects as illustrative and not restrictive. The scope of the disclosure should be determined by reasonable interpretation of the appended claims, and all changes coming within the equivalency range of the disclosure are intended to be embraced in the scope of the disclosure.

What is claimed is:

1. A display device comprising:
a display panel;
a frame positioned behind the display panel;
a substrate positioned between the display panel and the frame, and coupled to the frame;
a plurality of light sources positioned on the substrate and providing light to the display panel;
a diffusion plate positioned between the display panel and the plurality of light sources;
a film coupled to the substrate between the diffusion plate and the substrate, and through which the plurality of light sources pass; and
a reflective sheet positioned between the film and the substrate, coupled to the film and the substrate, and through which the plurality of light sources pass,
wherein the film comprises a spacer depressed toward the diffusion plate from a rear surface of the film and supporting the diffusion plate,
wherein edges of the reflective sheet are positioned outside edges of the film, and
wherein the reflective sheet comprises an optical pattern which is positioned between the edges of the reflective sheet and the edges of the film, which is formed on the reflective sheet, and which includes a yellow-based phosphor.

2. The display device of claim 1, further comprising an optical sheet positioned between the display panel and the diffusion plate, and including a phosphor,
wherein the film comprises a blue-based fluorescent dye or a light-absorbing dye.

3. The display device of claim 1,
wherein the film comprises a light-transmitting material.

4. The display device of claim 1, wherein the film further comprises a plurality of holes formed through the film, and positioned between the plurality of light sources.

5. The display device of claim 1, wherein the optical pattern further comprises:
a plurality of first dots adjacent to the edges of the reflective sheet and arranged along the edges of the reflective sheet; and
a plurality of second dots adjacent to the edges of the film and arranged along the edges of the film,
wherein the plurality of light sources are closer to the plurality of second dots than the plurality of first dots, and
wherein a size of each of the plurality of second dots is equal to or greater than a size of each of the plurality of first dots.

6. The display device of claim 1, wherein the optical pattern further comprises:
a plurality of dots adjacent to the edges of the reflective sheet and arranged along the edges of the reflective sheet; and
a plurality of lines adjacent to the edges of the film and arranged along the edges of the film,
wherein the plurality of light sources are closer to the plurality of lines than the plurality of dots, and
wherein a length of each of the plurality of lines is greater than a diameter of each of the plurality of dots.

7. The display device of claim 1, wherein the spacer has a cylindrical shape or a truncated cone shape, and
wherein a front end of the spacer is formed flat and supports a rear surface of the diffusion plate.

8. The display device of claim 1, wherein the spacer comprises an elastic portion positioned between a front end of the spacer and a rear end of the spacer, protruded convexly outward or recessed concavely inward from a lateral surface of the spacer, and
wherein the elastic portion extends along a periphery of the spacer and has elasticity.

9. The display device of claim 1, wherein the spacer comprises:
a support portion spaced rearward from a rear surface of the diffusion plate, and facing the rear surface of the diffusion plate; and
an elastic portion depressed toward the diffusion plate from a rear surface of the support portion, and supporting the rear surface of the diffusion plate, and
wherein the elastic portion comprises a flat front end and has elasticity.

10. The display device of claim 1, wherein the spacer comprises a plurality of spacers disposed between the plurality of light sources, and left-right symmetric with respect to a vertical line passing through a center of the film.

11. The display device of claim 1, wherein the substrate further comprises a plurality of substrates spaced apart from each other while being adjacent to each other,
wherein the film further comprises a plurality of films aligned with the plurality of substrates in a front-and-rear direction,
wherein the plurality of substrates each comprise at least one rib protruding rearward from an edge of each of the plurality of substrates, and engaged by one side of the frame, and
wherein the frame further comprises a plurality of bosses protruding forward from a front surface of the frame, and passing through the plurality of substrates and the plurality of films.

12. The display device of claim 1, further comprising a fastening member passing through the film and the substrate, and fixed to the frame,
wherein the fastening member has a white or blue color, a reflective material is coated on a surface of the fastening member.

13. A display device comprising:
a display panel;
a frame positioned behind the display panel;
a substrate positioned between the display panel and the frame, and coupled to the frame;
a plurality of light sources positioned on the substrate and providing light to the display panel;

a diffusion plate positioned between the display panel and the plurality of light sources; and a film coupled to the substrate between the diffusion plate and the substrate, and through which the plurality of light sources pass, wherein the film comprises a spacer depressed toward the diffusion plate from a rear surface of the film and supporting the diffusion plate, wherein edges of the substrate are positioned outside edges of the film, and wherein the substrate comprises an optical pattern which is positioned between the edges of the substrate and the edges of the film, which is formed on the substrate, and which includes a yellow-based phosphor.

14. A display device comprising:

a display panel;

a frame positioned behind the display panel;

a substrate positioned between the display panel and the frame, and coupled to the frame;

a plurality of light sources positioned on the substrate and providing light to the display panel;

a diffusion plate positioned between the display panel and the plurality of light sources; and a film coupled to the substrate between the diffusion plate and the substrate, and through which the plurality of light sources pass, wherein the film comprises a spacer depressed toward the diffusion plate from a rear surface of the film and supporting the diffusion plate, wherein the spacer further comprises an elastic portion which forms a rear end of the spacer and which is rounded, and wherein the elastic portion extends along a periphery of the spacer and has elasticity.

* * * * *